United States Patent [19]
Rowe et al.

[11] Patent Number: 5,781,785
[45] Date of Patent: Jul. 14, 1998

[54] METHOD AND APPARATUS FOR PROVIDING AN OPTIMIZED DOCUMENT FILE OF MULTIPLE PAGES

[76] Inventors: Edward R. Rowe, 701 W. 32nd St., #14, Los Angeles, Calif. 90007; Eswar Priyadarshan, 1054 Heatherston Ave., Sunnyvale, Calif. 94087

[21] Appl. No.: 533,875

[22] Filed: Sep. 26, 1995

[51] Int. Cl.⁶ .................................................. G06F 17/21
[52] U.S. Cl. ..................... 395/774; 395/610; 395/616; 395/942; 395/946; 395/762; 395/779; 395/788
[58] Field of Search .................................. 395/610, 602, 395/788, 616, 946, 942, 762, 779, 774

[56] References Cited

U.S. PATENT DOCUMENTS

| | | | |
|---|---|---|---|
| 4,532,588 | 7/1985 | Foster | 364/200 |
| 4,648,061 | 3/1987 | Foster | 264/900 |
| 4,754,326 | 6/1988 | Kram et al. | 364/900 |
| 5,029,112 | 7/1991 | Sakamoto et al. | 364/521 |
| 5,146,552 | 9/1992 | Cassorla et al. | 395/145 |
| 5,276,793 | 1/1994 | Borgendale et al. | 395/148 |
| 5,293,473 | 3/1994 | Hesse et al. | 395/146 |
| 5,557,722 | 9/1996 | De Rose et al. | 395/148 |
| 5,572,643 | 11/1996 | Judson | 395/793 |

OTHER PUBLICATIONS

Bienz, Tim, and Cohn, Richard, Portable Document Format Reference Manual, Addison–Wesley 1993.

*Primary Examiner*—Thomas G. Black
*Assistant Examiner*—Jean Raymond Homere
*Attorney, Agent, or Firm*—Fish & Richardson P.C.

[57] ABSTRACT

A method and apparatus for providing an optimized page-based electronic document file and downloading the optimized file. An optimized document file is created from a non-optimized electronic document. Page contents are contiguously written in the optimized file and a page offset table is provided in the optimized file that includes page offset information used to locate individual pages and objects of the document. Shared objects, such as fonts, are included in the file after the page contents. When downloading the optimized file from a host, the page offset information is read early and is used to download a specific page requested by the user without downloading other pages in the document. A viewer preferably downloads a first portion of the requested page, while all remaining portions of the requested page are located and requested by a finder process using the page offset table. The requested page can thus be downloaded with only one connection to the host. Shared objects can be downloaded interleaved between portions of the page contents that reference the shared objects. The requested page is displayed to the user on an output display device.

26 Claims, 16 Drawing Sheets

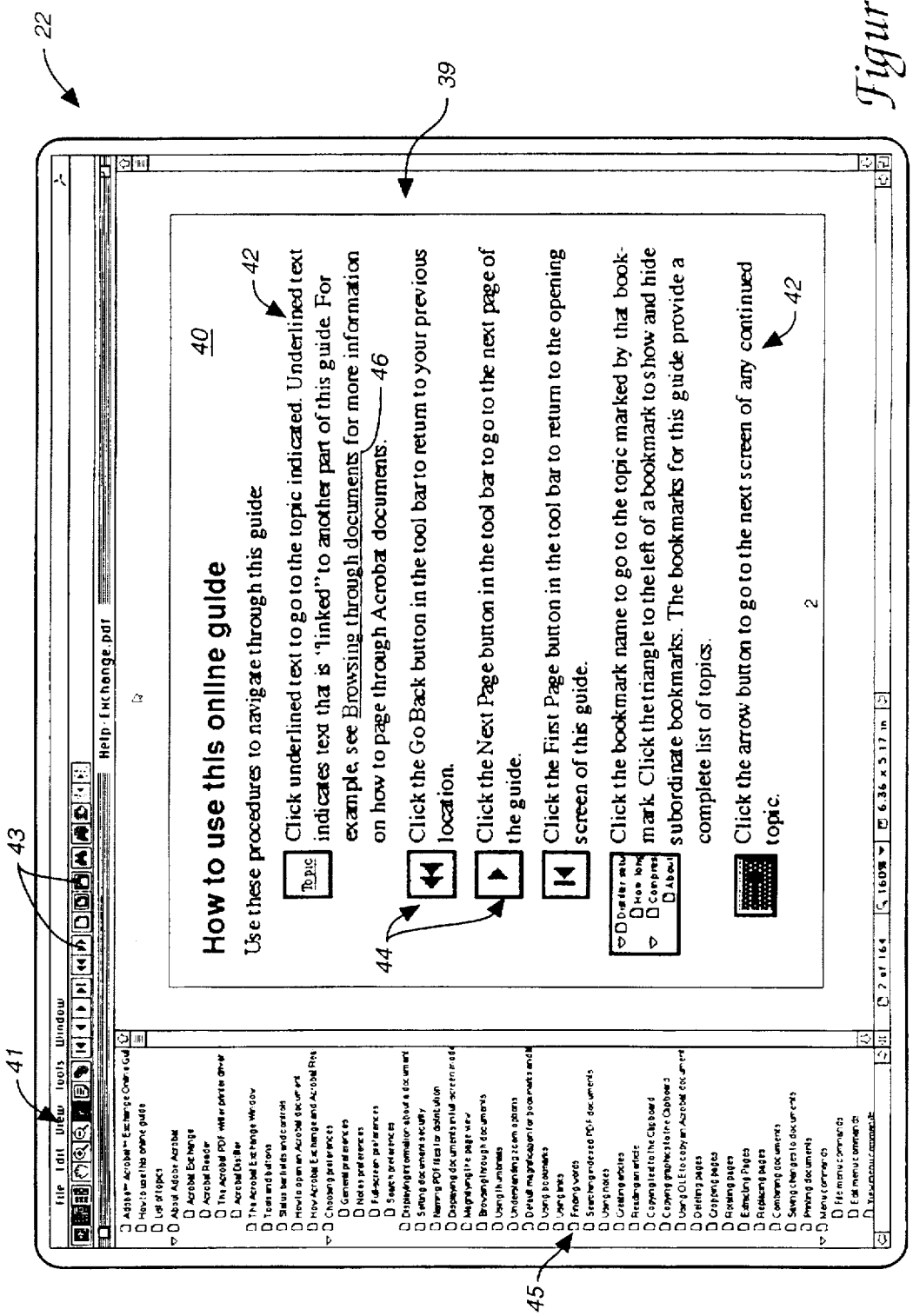

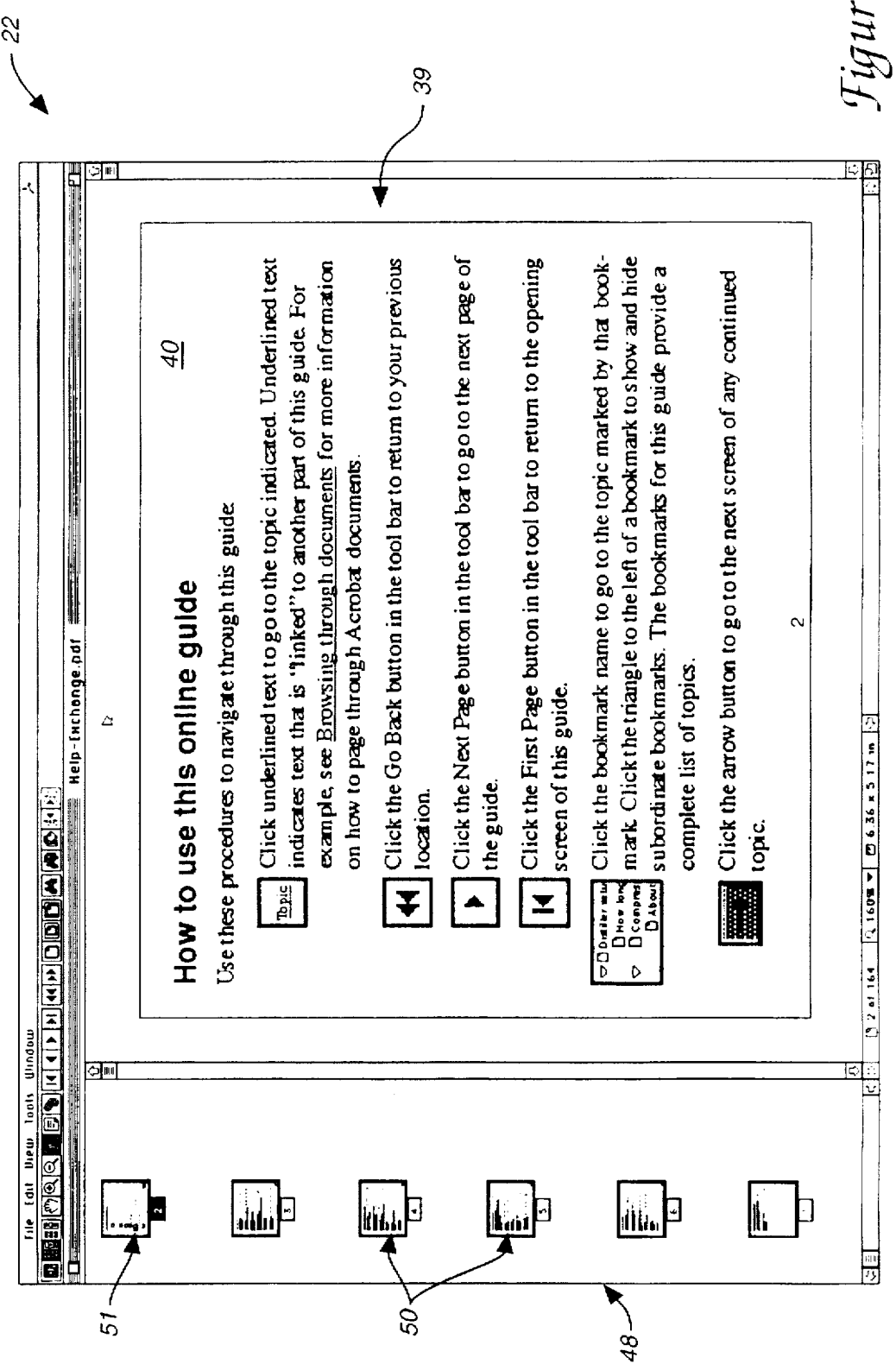

PAGE OFFSET TABLE — 68

HOUSEKEEPING INFORMATION
NUMBER OF PAGES IN DOCUMENT
LEAST NUMBER OF OBJECTS ON A PAGE
LOCATION OF CROSS REFERENCE TABLE
SIZE (IN BITS) TO REPRESENT # OBJECTS ON PAGE
LEAST SIZE OF A PAGE IN DOCUMENT
SIZE (IN BITS) TO REPRESENT LARGEST PAGE LENGTH
NUMBER OF SHARED OBJECTS IN DOCUMENT
   NUMBER OF NON-CONTENTS SHARED OBJECTS
   LEAST SIZE OF A SHARED OBJECT
   FRACTION SIZE
   SIZE (IN BITS) OF DIVIDEND FOR FRACTION

FOR EACH PAGE
NUMBER OF OBJECTS ON PAGE
LENGTH (SIZE) OF PAGE
LENGTHS OF SHARED OBJECTS ON PAGE
SIGNATURES FOR SHARED OBJECT
SHARED OBJECT FLAG
SHARING ID'S
APPROX. PAGE CONTENTS FRACTION
FRACTIONS

*Figure 8a*

RANGE TABLE — 66

HOUSEKEEPING INFORMATION
NUMBER OF RANGES
VERSION
SIZE (IN BITS) FOR EACH LENGTH
SIZE (IN BITS) FOR EACH OFFSET

POINTER TO PAGE OFFSET TABLE

OFFSETS
LENGTHS
SIGNATURE FLAGS
SIGNATURES

*Figure 9a*

METHOD AND APPARATUS FOR PROVIDING AN OPTIMIZED DOCUMENT FILE OF MULTIPLE PAGES

BACKGROUND OF THE INVENTION

The present invention relates generally to the storage and retrieval of data for a computer system, and more particularly to a method and apparatus for optimizing page-based data documents for fast retrieval over networks, and to a method and apparatus for accessing such optimized documents.

It has become increasingly common to create, transmit, and display documents in electronic form. Electronic documents have a number of advantages over paper documents including their ease of transmission, their compact storage, and their ability to be edited and/or electronically manipulated. An electronic document typically has information content (such as text, graphics, and pictures) and formatting information which directs how the content is to be displayed. With recent advances in multimedia technology, documents can now also include sound, full motion video, and other multimedia content.

An electronic document is provided by an author, distributor or publisher (referred to as "publisher" herein) who often desires that the document be viewed with the appearance with which it was created. This, however, creates a problem in that electronic documents are typically widely distributed and, therefore, can be viewed on a great variety of hardware and software platforms. For example, the video monitors being used to view the document can vary in size, resolution, etc. Furthermore, the various software platforms such as DOS, Microsoft Windows™, and Macintosh™ all have their own display idiosyncrasies. Also, each user or "reader" of the electronic document will have his or her own personal viewing preferences, which should be accommodated, if possible.

A solution to this problem is to provide a "portable electronic document" that can be viewed and manipulated on a variety of different platforms and can be presented in a predetermined format where the appearance of the document as viewed by a reader is as it was intended by the publisher. One such predetermined format is the Portable Document Format™ (PDF™) developed by Adobe Systems, Inc. of Mountain View, Calif. An example of page-based software for creating, reading, and displaying PDF documents is the Acrobat™ software, also of Adobe Systems, Inc. The Adobe Acrobat software is based on Adobe's PostScript® technology which describes formatted pages of a document in a device-independent fashion. An Acrobat program on one platform can create, display, edit, print, annotate, etc. a PDF document produced by another Acrobat program running on a different platform, regardless of the type of computer platform used. A document in a certain format or language can be translated into a PDF document using Acrobat. A PDF document can be quickly displayed on any computer platform having the appearance in tended by the publisher, allowing the publisher to control the final appearance of the document.

One relatively new application for portable electronic documents is the retrieval of such documents from the "internet", the globally-accessible network of computers that collectively provides a large amount and variety of information for users. From services of the internet such as the World Wide Web, users may retrieve or "download" data from internet network sites and display the data that includes information presented as text in various fonts, graphics, images, and the like having an appearance intended by the publisher. A file format such as PDF that allows any platform to view a document having an appearance as intended by a publisher is thus of great value when downloading files from such widely-accessible and platform-independent network sources such as the internet.

One problem with previous page-based data downloading processes is that all of the data of a document is typically downloaded before any portion of the document is displayed to the user. Thus, the user must wait for an entire document to download before seeing a page or other portion of the document on the display screen. This can be inconvenient when the user wishes to use only a portion of the document, i.e., view only specific pages or a specific number of contiguous pages of a document. Some searching processes allow a word to be searched in a document and will download only a portion of the document which includes the searched word. However, this portion of the document is an isolated, separate portion that has no connection with the rest of the document. If the user wishes to view the next page after the downloaded portion, he or she must inconveniently either download the entire document or specify a search term on the next page of the document.

Acrobat and similar programs for displaying portable electronic documents such as PDF documents are often page-based, which means that the program typically organizes and displays a desired page of the document at a time. Typically, the entire document was downloaded at once, then desired pages displayed. However, Acrobat is conducive to downloading a page of a document at a time from a document file, while still allowing a user to conveniently select other pages of the document. However, for such page-based formats, the document data usually is not stored continguously in a page order within a file, data structure, or other collection of document data ("document file" as referred to herein). For example, a document file in the PDF format may store a page having objects such as a page contents object (including text, graphics shapes, display instructions, etc.) and image objects. However, the objects may be stored in the document in a scattered or disjointed manner. For example, portions of the page contents object can be scattered in different places in a document file, and shared objects such as fonts can be stored anywhere in the file. Since the output display device displays the page contents and shared objects based upon pointers to related objects, objects do not have to be stored sequentially or contiguously in the document file, and are typically stored in a disjointed manner.

This disjointed data storage for pages can lead to problems when attempting to download a specific page of a document desired by the user. One major problem is time delays caused by making, multiple connections when downloading data. For example, a viewing program for displaying page-based data at a client computer begins downloading a PDF (or similar format) file from a remote host computer. The viewing program makes one connection to the host and downloads data from the first portion of the page, then must make another connection to the host to retrieve the next, disjointed portion of the page. This has the effect of slowing down the downloading of the page, since each connection takes time to establish. The user requesting the page thus must wait several seconds before the viewer receives all of the data for the page and displays the page. This problem is compounded when fonts or other such referenced objects are included on the page, since yet another connection must be made to the host to retrieve these objects before the page can be displayed.

The time delays for downloading a page can become even lengthier when a randomly-accessed page is desired to be viewed by the user. In PDF files, objects are provided in a "page tree" which the viewer consults to determine where in the document file the root of a randomly-accessed page is positioned. The page tree is a data structure in which every node must be visited in order to determine all the children objects in the tree. Thus, many page nodes may need to be visited to determine where a page root object is located in the document file. The page tree can thus be quite large, and downloading it from the document slows down the downloading process. In addition, the page tree is often so large or disjointed that multiple connections to the host are required to download it.

Therefore, there is a need for a method and apparatus for providing optimized page-based documents and downloading desired pages from such documents without causing an excessive delay before displaying a page, or portions of a page, to the user.

SUMMARY OF THE INVENTION

The present invention provides a method and apparatus for optimizing a page-based electronic document and downloading desired pages from the optimized document without excessive time delays.

A method of the present invention provides an optimized document file from a non-optimized electronic document having one or more pages. Page content information is written contiguously in the optimized document file and describes individual pages of the document. A page offset table is also provided in the optimized document file that includes page offset information used to locate individual pages of the document. Objects shared by multiple pages are also preferably provided in the optimized document file, contiguously located after all of the page content information, and the page offset information includes offsets (locations) to these shared objects. The page content information includes text and graphics, and the shared objects can include font objects and image objects. To provide the page contents and shared objects contiguously in the file, an internal list of non-shared objects and shared objects in the document file is created. A list of pages that share objects is also created that includes the shared objects used by each sharing page and, for such each shared object, a portion of the page contents in which the shared object is referenced. In addition, page one offset information is preferably provided in a range table for a first page of the optimized document file. This page one offset information describes the locations of all portions of the first page in the document file. The offsets to page content for page one can be interleaved in the range table with offsets to shared objects referenced by the page content for the first page.

Another method of the present invention efficiently downloads the page-based optimized document created as described above. The page offset information is read early during the downloading process. Beginning and ending offsets of each page of the document can preferably be derived from the page offset information. Using the page offset information, a specific page requested by the user is downloaded, and any page desired by the user can readily be downloaded without the necessity of downloading other pages in the document. Preferably, the page offset information is read before the downloading of more than one page of the document has been completed. Prior to reading the page offset information, a pointer is preferably located in the document file which points to the location of the page offset information. This pointer is preferably read ahead of or during the reading of the first page of the document.

Preferably, the specific page requested by the user is downloaded by a client computer system with only one connection to a host which stores the optimized document file. The requested page, while being downloaded, is preferably displayed to the user on an output display device, such as a display screen or printer. The downloading can be accomplished by a viewer program implemented on the client computer system. When connecting and downloading, the viewer preferably downloads a first portion of the requested page, while all remaining portions of the requested page are located and requested by a finder process implemented on the client computer using the page offset table. These additional portions are downloaded during the client computer's one connection with the host, thus saving time by avoiding multiple connections. The additional portions of the specific page include shared objects referenced by page contents of the specific page. Preferably, the shared objects are downloaded in an interleaved order between portions of the page contents that reference the shared objects.

The interleaving process includes downloading a first portion of page content from the requested page, where the first portion of page content includes a reference to a shared object. The first portion preferably includes all contiguous page content of the document until the (approximate) point of reference to the shared object. Then, the shared object referenced by the first portion of the page is downloaded. The shared object is, for example, a font or similar referenced object that is needed to display the first portion of page content. A second portion of page content from the requested page is then downloaded, where the second portion is contiguous with the first portion of page content. The locations of the first and second portions of page content and the shared objects in the page-based document are derived using the page offset table.

An apparatus of the present invention is also described for efficiently downloading a page-based document stored on a host, as described above. The apparatus includes a digital processor, a memory device, and a display screen. Furthermore, a mechanism for displaying the page-based document on the display screen is included which connects with the host to download the page offset information and/or to download a specific page of the document requested by the user without downloading other pages in the document. A downloaded page can be displayed on the display screen. A finder uses the page offset information to provide a location of the specific page in the document to the displaying mechanism so that the the specific page can be downloaded. The finder can preferably requests additional portions of the specific page during one connection, and can interleave the downloading of portions of page contents and shared objects.

An advantage of the present invention is that only specific, desired pages of a document located on a remote host can be downloaded, resulting in a faster display time for those pages since the entire document need not be downloaded. In addition, a page-based electronic document file is optimized to include contiguously-stored page contents and a page offset table. The speed of downloading individual pages from the optimized file is increased by determining page locations in the optimized file from the page offset table. All page contents and shared objects for a page can be downloaded at one connection to the host, thus avoiding the time delays of multiple connections.

Another advantage of this invention is that portions of page contents can be downloaded in an interleaved order with shared objects such as fonts that are needed to display those portions of page contents. This allows a downloaded portion of the page to be displayed more quickly without having to wait for referenced shared objects to be downloaded at a later time.

These and other advantages of the present invention will become apparent to those skilled in the art upon a reading of the following specification of the invention and a study of the several figures of the drawing.

BRIEF DESCRIPTION OF THE DRAWINGS

FIG. 2a is a diagrammatic illustration of a display screen of a viewer displaying a page from a portable electronic document and a bookmark view;

FIG. 2b is a diagrammatic illustration of the display screen of the viewer displaying a page from a portable electronic document and a "thumbnails" window;

FIG. 8a is a diagrammatic illustration of a page offset table created in the process of FIG. 8;

FIG. 9a is a diagrammatic illustration of the range table created in the process of FIG. 9;

DETAILED DESCRIPTION OF THE PREFERRED EMBODIMENT

The present invention is well-suited for downloading pages of data of a portable electronic document from a host computer. More particularly, a portable electronic document in Portable Document Format (PDF) and like formats can be optimized by the present invention. The present invention is suitable for organizing and downloading page-based files such that the time for downloading and displaying pages of the file is minimized.

Figure 1:
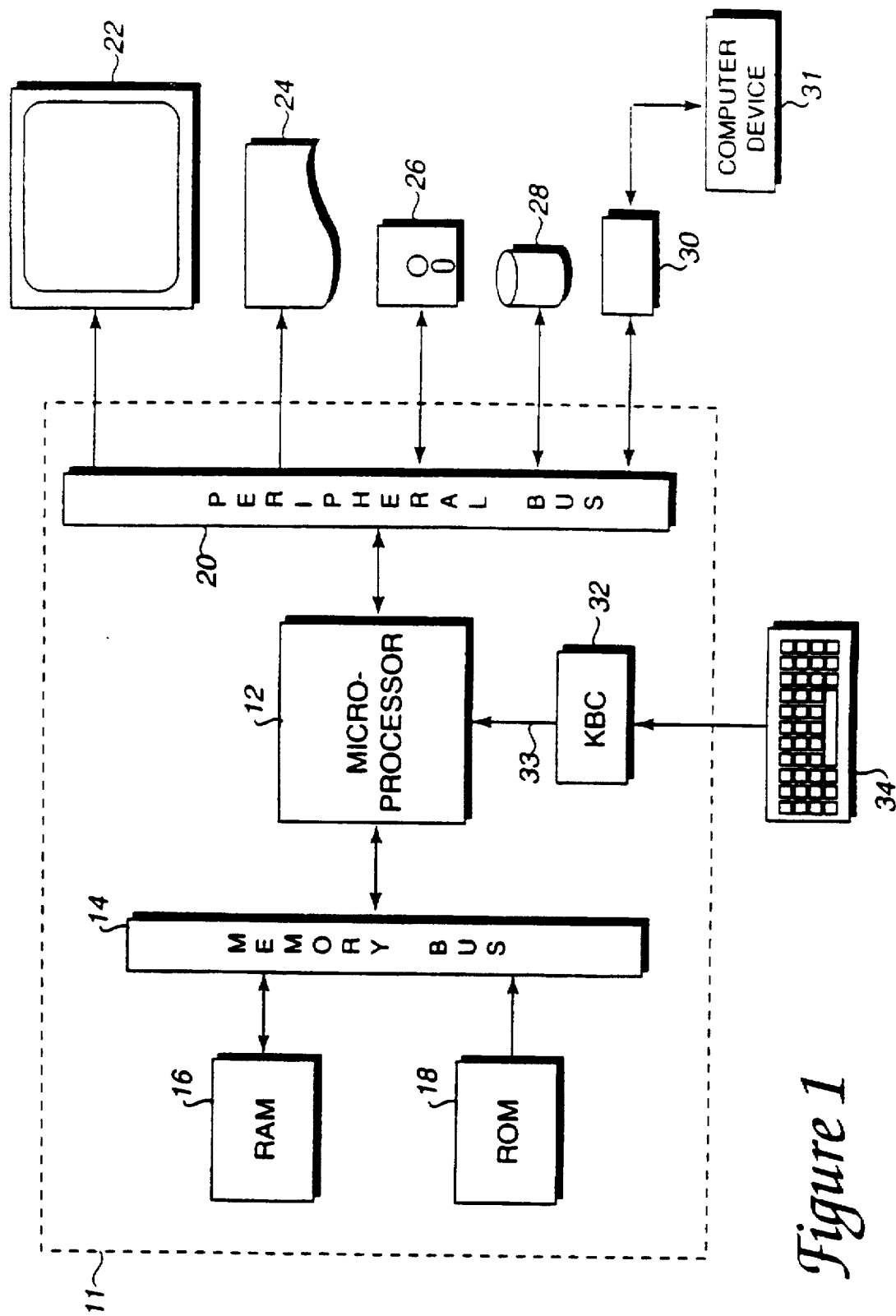
FIG. 1 is a block diagram of a computer system for providing an optimized document and/or downloading data from an optimized file in accordance with the present invention.

In FIG. 1, a computer system 10 for downloading a portable electronic document can include a digital computer 11, a display screen 22, a printer 24, a floppy disk drive 26, a hard disk drive 28, a network interface 30, and a keyboard 34. Other types of peripherals can also be included, such as a CD-ROM drive, input tablet or other interface devices, etc. Digital computer 11 typically includes a microprocessor 12, a memory bus 14, random access memory (RAM) 16, read only memory (ROM) 18, a peripheral bus 20, and a keyboard controller 32. Digital computer 11 can be a personal computer (such as an IBM-PC AT-compatible or Macintosh personal computer), a workstation (such as a SUN or Hewlett-Packard workstation), etc.

Microprocessor 12 is a general purpose digital processor which controls the operation of computer system 10. Microprocessor 12 can be a single-chip processor or can be implemented with multiple components. Using instructions retrieved from memory, microprocessor 12 controls the reception and manipulation of input data and the output and display of data on output devices. In the described embodiment, a function of microprocessor 12 is to read and process data from pages of an electronic document.

Memory bus 14 is used by microprocessor 12 to access RAM 16 and ROM 18. RAM 16 is used by microprocessor 12 as a general storage area and as scratch-pad memory, and can also be used to store downloaded data that is being displayed (or not being displayed). ROM 18 can be used to store instructions followed by microprocessor 12 and other permanent data.

Peripheral bus 20 is used to access the input, output, and storage devices used by digital computer 11. In the described embodiment, these devices include display screen 22, printer device 24, floppy disk drive 26, hard disk drive 28, and network interface 30. Keyboard controller 32 is used to receive input from keyboard 34 and send decoded symbols for each pressed key to microprocessor 12 over bus 33.

Display screen 22 is an output device that displays images of data provided by microprocessor 12 via peripheral bus 20 or provided by other components in the computer system. In the described embodiment, display screen 22 is a raster device which displays images on a screen corresponding to bits of a bitmap in rows and columns of pixel, as is well known to those skilled in the art. That is, a bitmap can be input to the display screen 22 and the bits of the bitmap - can be displayed as pixels. An input bitmap can be directly displayed on the display screen, or components of computer system 10 can first render codes or other image descriptions from a page description file into bitmaps and send those bitmaps to be displayed on display screen 24, as is also well known. Raster display screens such as CRT's, LCD displays, etc. are suitable for the present invention.

Printer device 24 provides an image of a bitmap on a sheet of paper or a similar surface. Printer 24 can be a laser printer, which, like display screen 22, is a raster device that displays pixels derived from bitmaps. Printer device 24 can print images derived from data such as found in a portable electronic document. Other output devices can be used as printer device 24, such as a plotter, typesetter, etc. Computer system 10 can display images on a display output device, such as display screen 22 or printer 24, using data from memory, a storage device, or from another source or host over a network connected by network interface 30.

Floppy disk drive 26 and hard disk drive 28 can be used to store data such as a document that has been downloaded or created in the optimized format of the present invention. Floppy disk drive 26 facilitates transporting such data to other computer systems, and hard disk drive 28 permits fast access to large amounts of stored data. Other mass storage units such as nonvolatile memory (e.g., flash memory), PC-data cards, or the like, can also be used to store data used by computer system 10. Herein, a "computer (or machine) readable storage medium" can refer to both memory such as RAM 16 and ROM 18 as well as disk drives 26 and 28 or any other type of device for storing data.

Network interface 30 is used to send and receive data over a network connected to one or more other computer systems, such as computer device 31. An interface card, modem, or similar device and appropriate software implemented by microprocessor 12 can be used to connect computer system 10 to an existing network and transfer data according to standard protocols. In the present invention, network interface 30 can be used to retrieve or "download" portable electronic documents from a host computer system over a network, or send ("upload") the documents to a host or client computer system. The network can be implemented using a variety of hardware and software, as is well known to those skilled in the art.

Keyboard 34 is used by a user to input commands and other instructions to computer system 10. Images displayed on display screen 22 or accessible to computer system 10 can be edited, searched, or otherwise manipulated by the user by inputting instructions on keyboard 34. Other types of user input devices can also be used in conjunction with the present invention. For example, pointing devices such as a computer mouse, a track ball, a stylus, and/or a tablet can be used to manipulate a pointer on a screen of a general-purpose computer.

Computer system 10 can also be used as a host or source computer for creating and/or providing the optimized documents of the present invention to "client" (receiving) computer systems that download the documents. Alternatively, the host computer can be a file server or other type of mass storage apparatus.

FIG. 2a is a diagrammatic illustration of a display screen 22 showing displayed visual representations from a portable electronic document. The present invention is primarily directed to creating and downloading pages of portable electronic documents. A "portable electronic document" is a collection of data which includes objects which have been stored in a portable electronic document language. The document is organized and stored in a "document file", which can be a storage unit such as a file, data structure, or the like. Portable electronic documents can be stored in a variety of different languages and formats. Herein, the portable electronic document is described with reference to the Portable Document Format (PDF) by Adobe Systems, Inc. of Mountain View, Calif. or similar types of formats. PDF is a "page-based" format, in that a document includes a number of pages and is typically presented to a user on a page-by-page basis, i.e. the user typically views one page (or a portion of a page) at a time on a display screen. Other page-based document formats with similar document structures can also be adapted for use with the present invention.

Portable electronic document languages, such as PDF, typically store data as objects. An "object", as used herein, is a logical software unit comprising data and processes which give it capabilities and attributes. For example, an object can be queried as to its type and can return such data as the number of words that it contains, its location in coordinates (e.g. location of the object's bounding box (BBOX)), etc. Objects can contain or refer to other objects of the same or of a different type. Objects can also be used to project images on a screen according to their object type. There are many well known texts which describe object oriented programming. Examples of object types used in typical PDF files include page objects, page contents objects (including text characters, words, etc. and/or graphical objects such as polygon shapes, commands, etc.), image objects (e.g., bitmaps), font objects, and user-specific objects. Some objects can include direct references to other objects, and/or information used to display the object. In a PDF document, for example, a page object can reference a page contents object that includes commands and text characters, where the text characters are provided as character codes representing the identity of the text characters. The page contents object can include the location to display the text, such as coordinates used to display a bounding box around the text, and other information, such as the size and orientations of the characters. The page contents object can also refer to "shared objects", such as fonts (described below). Portable electronic documents, as defined herein, differ from normal ASCII text files, since ASCII text documents or files include only ASCII codes of characters and no other display information. Herein, objects may be "on" the page described by a page object, which is equivalent to an object being "referred to" by the page object.

In FIG. 2a, display screen 22 shows a displayed page representation 40 derived from data received from a portable electronic document. Page representation 40 is displayed on the screen in a view window 39 by a viewer program from objects stored in the portable electronic document, and are typically derived from rendered bitmaps as is well known to those skilled in the art. A viewer application program ("viewer") is preferably running on computer system 10 and can typically display an entire page, or a portion of a page, of a portable electronic document. The data for the page is requested by the viewer and received from a storage device or other computer. In the preferred process of the present invention, the data for page 40 is downloaded from a host computer and displayed. The viewer preferably also offers features such as menu headings 41, selection buttons 43, and a table of contents or "bookmark" view 45. These features allow a user to manipulate the received data and view the page data according to user preferences. For example, menu headings allow a user to view, copy, load, save, search, or similarly manipulate the downloaded page. Selection buttons 43 similarly allow a user to view or manipulate the document in different ways by zooming, selecting the next page of the portable electronic document, etc. Bookmark 45 allows a user to select and display a particular portion of the document that the user (or a different user) has specifically marked and labelled with text (or, alternatively, graphics). For example, different chapter headings can be displayed as labels in bookmark 45 so that when the user selects a chapter, the first page of that chapter is displayed in view window 39. A suitable viewer application program for use with the present invention is Acrobat™ Reader or Acrobat™Exchange, available from Adobe Systems, which can read, write, or manipulate page data stored in PDF format from a document file and display the data in a page-based format. Other viewers and file formats can be used in other embodiments.

Page representation 40 can include several different types of visual representations, including text 42, graphics 44, images, and links 46. Text 42 is derived from character codes and font objects stored in the document file. Text 42 can be rendered into a bitmap for display on screen 22, as is well known to those skilled in the art. Graphics 44 can also be rendered from coded shape primitives, such as lines and rectangles, and displayed. Images (not shown) are typically bitmap images, such as a scanned or digitized picture, and can be displayed on screen 22 by methods well known to those skilled in the art. Links 46 portray a topic or idea that can be accessed by the user and, for example, can enclose special text, graphics, or images to distinguish them from normal objects. Links 46 may be selected by the user to display a different portion of the portable electronic document that is related to the topic or idea portrayed by the link. Also, links 46 can be linked to other electronic documents that include the topic represented by the link to provide access to those other documents. For example, on many existing network services, links to many different documents available on the network are included in electronic documents. Page representation 40 can also be displayed on a sheet of paper output by printer 24. The computer determines the font, size, color, or other appropriate information for each object to be displayed by examining the associated font objects, color maps, size, and other information in the PDF document.

FIG. 2b shows a diagrammatic illustration of a display screen similar to the screen shown in FIG. 2a. In FIG. 2b, the bookmark view 45 has been replaced, due to a preference of the user, by a "thumbnails" window 48. Thumbnails window 48 displays page icons 50 (or "thumbnails"), each of which represents a separate page in the viewed portable electronic document. Icons 50 allow random access to any of the pages of the document, i.e., a user may select an icon 50 to display the corresponding page 40 in view window 39. The currently-displayed page preferably has a highlighted label, such as icon 51.

Figure 3A:
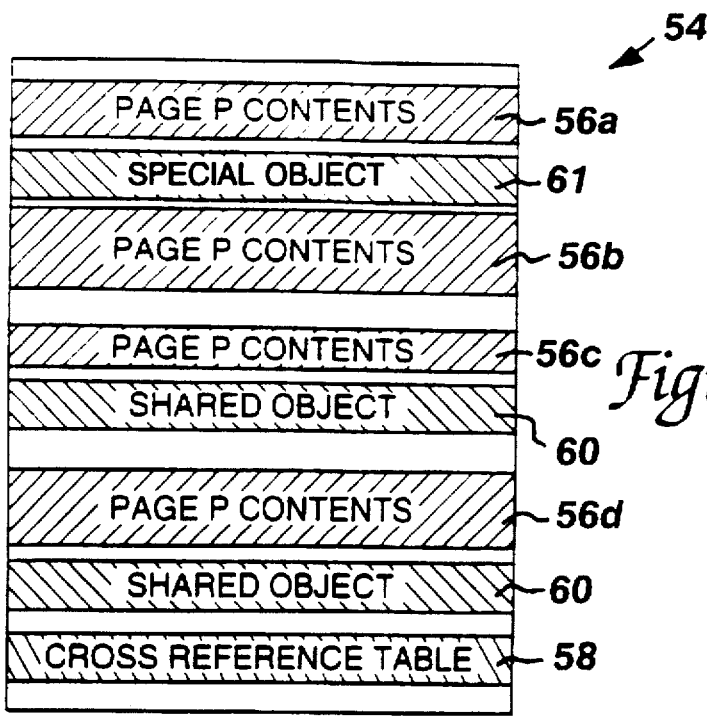
FIG. 3a is a diagrammatic illustration of an example of a non-optimized document file.

FIG. 3a is a diagrammatic illustration of a non-optimized document file 54. In the described embodiment, a document file having data stored in the PDF language is referenced as the main example. In other embodiments, the document file can have a different page-based format. A portable electronic document is typically stored as a non-optimized document file 54 as shown in FIG. 3a when written to a file or memory using normal processes of the prior art. A non-optimized document file includes page contents data 56 that is usually stored in a disjointed manner within the file 54. The page contents data includes data for text 42 and graphics 44 for a single page. In addition, the page contents data also includes other related data not shared by other pages, such as referenced (unshared) fonts, images, procsets, etc. For example, a particular page P has text/graphics page contents 56a placed at the beginning of the file 54, unshared image page contents 56b placed at a later position in the file discontinuous from contents 56a, a resource dictionary contents 56c discontinuous from contents 56b, and unshared font object contents 56d placed near the end of the file. All of these contents need to be read by the viewer to display the entire page P. Other pages of the document have page contents data 56 stored in file 54 in a similarly disjointed manner.

In addition, document file 54 preferably includes a cross reference table 58, which provides a table of each object in the document file 54 indexed to the location (offset) in the file where the object is located. The Portable Document Format Reference Manual, Adobe Systems Incorporated, Addison-Wesley Publishing Company, New York, 1993, describes the cross reference table, pages tree, and other features of the PDF file format, and is hereby incorporated by reference herein. The cross reference table 58 can be placed anywhere in the file, e.g. at the end of the file; or, parts of the cross reference table can be located in different portions of the file. Finally, the non-optimized document file 54 typically includes shared objects 60 and special objects 61 (described below), which are typically located throughout file 54 in a disjointed manner. Shared objects may be referenced by multiple page contents objects in the file, and can include font objects, color maps (or "color spaces"), and other objects which are necesarily referenced to influence the appearance of an object when displayed. Shared objects may also include any objects appearing on multiple pages and user-defined shared objects. The "shared objects" referred to herein may not be actually be shared in a particular instance; these objects, however, can be potentially shared. For example, a font might only be used by one page and may not be shared by other pages in a particular document, but it can potentially be shared by other pages. As is well known in the art, a PDF file typically relates objects in a "page tree" structure, where an object may refer to a child or descendant object. For example, a page object may refer to page contents 56 (child) objects, while the page contents objects further refer to (child) shared objects 60.

In a process of displaying a page of document file 54, the document file 54 is located on a separate host computer for purposes of the present invention. When a user requests that the viewer shown in FIGS. 2a and 2b display a particular page P of the document file on display screen 22, the viewer first establishes a connection to the host computer to access the desired document file. If the page contents are organized as shown in FIG. 3a, the viewer first downloads a designated amount of page contents 56a. After several possible connections to download contents 56a, another connection must typically be made by the viewer to access contents 56b, and so on. In addition, if a page P's contents reference a shared object such as a font, that font must first be downloaded before the page contents which require that font can be displayed. This all contributes to a long waiting period for the user before any portion of a page is displayed by the viewer.

Figure 3B:
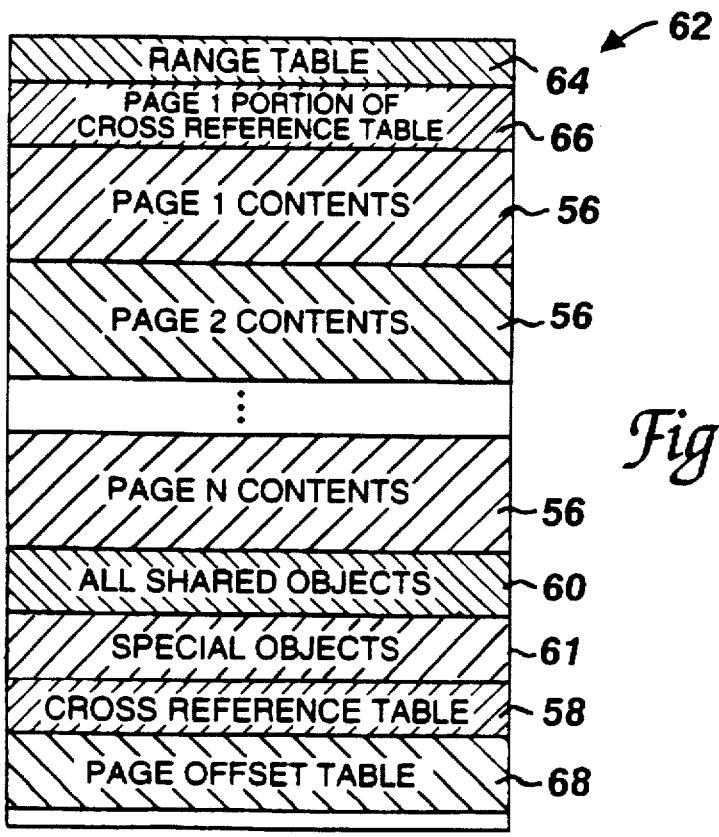
FIG. 3b is a diagrammatic illustration of an optimized document file of the present invention.

FIG. 3b is a diagrammatic illustration of an optimized document file 62 of the present invention. The data is file 62 has been organized to minimize the amount of time to download a page from a host computer and display the page by the viewer as shown in FIGS. 2a and 2b. Document file 62 includes a range table 66 stored at the beginning of the file, and a first page portion 64 of the cross reference table also stored near the beginning of the file. The page contents 56 are grouped and stored contiguously, so that a contiguous amount of the first page's contents 56 is stored, followed by a contiguous amount of page 2's contents 56, and so on until the end of page N's contiguous contents 56, where N is the last page number in the document. All shared objects 60 are preferably stored after the page contents data. Special objects 61 that are not required for displaying a page are preferably stored after shared objects 60. In the described embodiment, special objects include page icon (thumbnail) objects, bookmark objects, page tree objects, and the like. The cross reference table 58 is preferably stored after the special objects, and a page offset table 68 of the present invention is preferably stored at the end of the file. The page offset table provides the locations of pages in the document file 62 and shared object information to the viewer, as described subsequently. In alternate embodiments, the page offset table can be stored in other areas of the file. The function of the organization of data as shown in FIG. 3b is described subsequently. Preferably, an application program such as the viewer shown in FIGS. 2a and 2b includes an option to save a viewed document (or a document on a specified storage device) as an optimized document file as shown in FIG. 3b. The user could then select whether to save a document in optimized or non-optimized format.

In alternate embodiments, the document data can be written in different locations of optimized document file 62. For example, the range table 66, cross reference table 58 or 64, or page offset table 64 can be placed at particular locations in the file 62, and the viewer can read those specific locations when particular data needs to be downloaded.

CREATING AN OPTIMIZED DOCUMENT FILE

Figure 4:
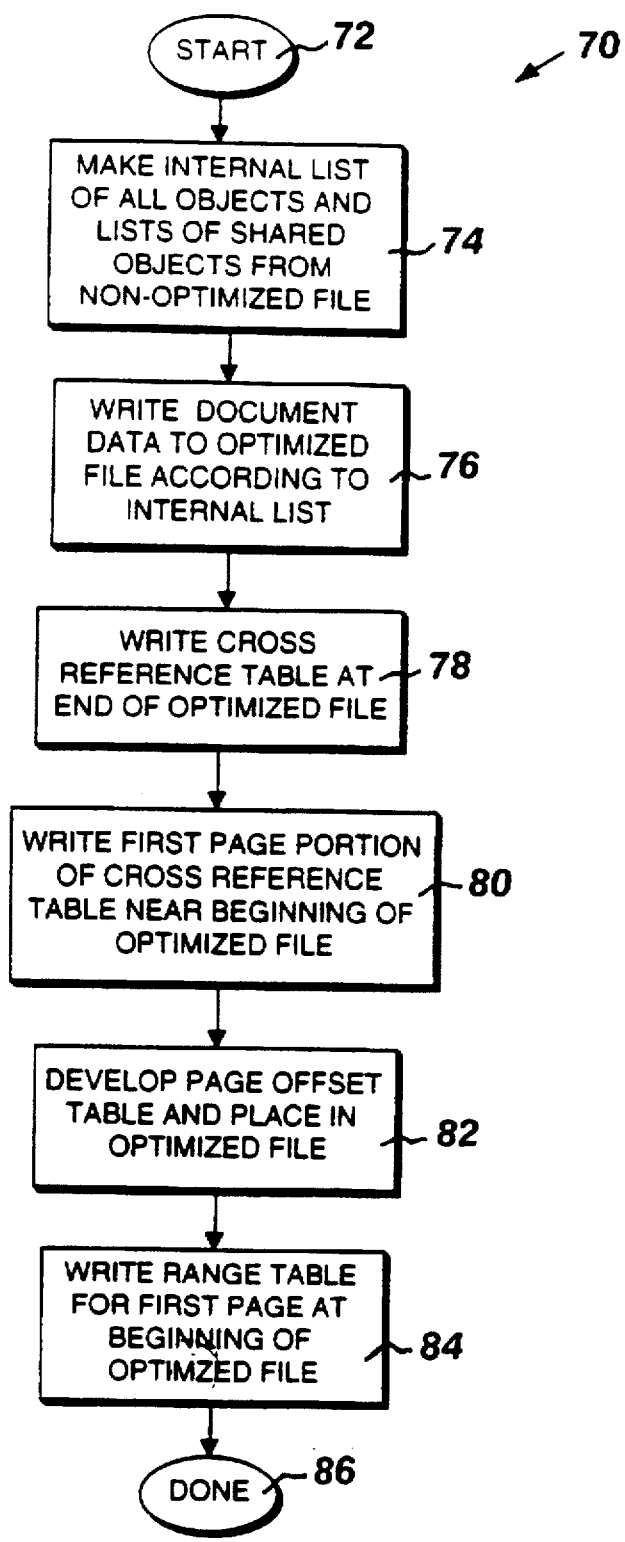
FIG. 4 is a flow diagram illustrating the process of the present invention for creating an optimized document file from an electronic document.

FIG. 4 is a flow diagram illustrating a preferred process 70 of the present invention for creating an optimized document file 62 of the present invention from a non-optimized document. The "non-optimized document file" can be stored as a file on a storage device, or can be partially or wholly stored in memory (such as RAM 16) of a computer system 10, such as during a viewing process as shown in FIGS. 2a and 2b. The non-optimized document, in the described embodiment, is in "normal" PDF format. The process 70 can be initiated by a user who wishes to save the non-optimized document as an optimized document file of the present invention. For example, a non-optimized document can be loaded into the RAM of a computer system and then saved to hard disk or other computer-readable storage medium as an optimized document file 62. For example, PDFWriter or Acrobat Distiller from Adobe Systems are used to write PDF files from application programs, and can be used to implement the process 70. The saved optimized file 62 can, for example, be made available on a host computer or server ("host" or "host computer") to client computer systems that may request the document for downloading. The process of the present invention for downloading optimized document file 62 is described in greater detail with respect to FIG. 10.

The process begins at 72. In step 74, an internal list of objects and lists of shared objects are created from the non-optimized document file. These lists help the process to organize the objects of the document for grouping the objects in the more optimized configuration of the present invention. The lists of shared objects are used to place shared objects in the document after the page contents objects. Step 74 is described in greater detail with respect to FIG. 5. In next step 76, the document information, including page content information 56, shared objects 60, and special objects 61 are written to the optimized document file according to the internal list organized in step 74. The process essentially retrieves each successive object name or "ID" in the internal list and writes the object to the optimized file in the same order. This has the effect of organizing the page contents 56, shared objects 60, and special objects 61 for all the pages of the document as shown in FIG. 3b. In addition, space is preferably allocated at the beginning of the optimized file to store the cross reference table portion 64 and range table 66, which are described subsequently. Also, information for the cross reference table 58 describing the locations of objects in the file is stored in memory as the objects are written in this step.

In an alternate embodiment, the page contents and shared objects can be stored in optimized document file 62 in an interleaved order, where portions of page contents are followed by shared objects referenced by those portions (in the preferred embodiment, the data is read or downloaded in an interleaved order, but is not stored in the interleaved order). Interleaving is described in greater detail with reference to FIGS. 9 and 12. In one (alternate) preferred embodiment, only the first page's contents are physically stored in an interleaved order in the optimized file so that range table 66 need not be downloaded, which saves a connection to the host computer and reduces initial downloading time of the file.

In next step 78, the cross reference table 58 (or equivalent structure using other file formats) is preferably written to the end of the file after the special objects 61, as shown in FIG. 3b. The cross reference table 58 is a listing of objects in the document and the offsets (e.g., in bytes) from the beginning of the file for the start of each object, and allows random access to the objects in the document (the cross reference table, however, does not provide the types of objects or pages where objects are located). A "trailer" for a PDF file can also be written is this step. The information for the cross reference table is determined as each object is written to the optimized file in step 76, as explained above. The formation of cross reference tables in PDF files are well known to those skilled in the art.

In step 80, the page one portion 64 of cross reference table 58 is written to the optimized document file 62, preferably near the beginning of the file (leaving room to store range table 66). This portion 64 of the cross reference table 58 refers to objects on the first page of the electronic document and is placed near the beginning of the file so that page one information can be retrieved as soon as possible in a downloading process. The contents of the first page can thus be displayed immediately upon receiving those contents when downloading document file 62 (as in FIG. 10).

In step 82, the page offset table 68 of the present invention is created and placed preferably near the end of the optimized file 62 after the cross reference table 58. The information in the page offset table allows any page of the electronic document to be quickly accessed and downloaded. The page offset table is included in the optimized file 62 so that a separate offset table file does not have to be downloaded, processed, updated, or associated with a page contents file. Preferably, a pointer to the page offset table is included in the range table 66 (described below) near the lo beginning of the file 62, so that the page offset table can be accessed after the first page one information has been downloaded in a downloading process. Since the page offset table is not needed to display page one of the document, it is not placed at the beginning of the file. Alternatively, the page offset table can be provided at other places in the optimized file 62, including at the beginning. The page offset table is described in greater detail with respect to FIG. 8.

In step 84, the range table 66 (and preferably a header) is written at the very beginning of the optimized file 62. The range table provides the offsets and lengths for the page contents and shared objects of the first page of the document, and thus functions somewhat like the page offset table 68. The process of writing the range table is described in greater detail with respect to FIG. 9. Other necessary information can also be written in this step; for example, PDF files store a pointer to the contents of the document file at the end of the file after the "trailer." The process 70 is then complete at 86.

Figure 5:
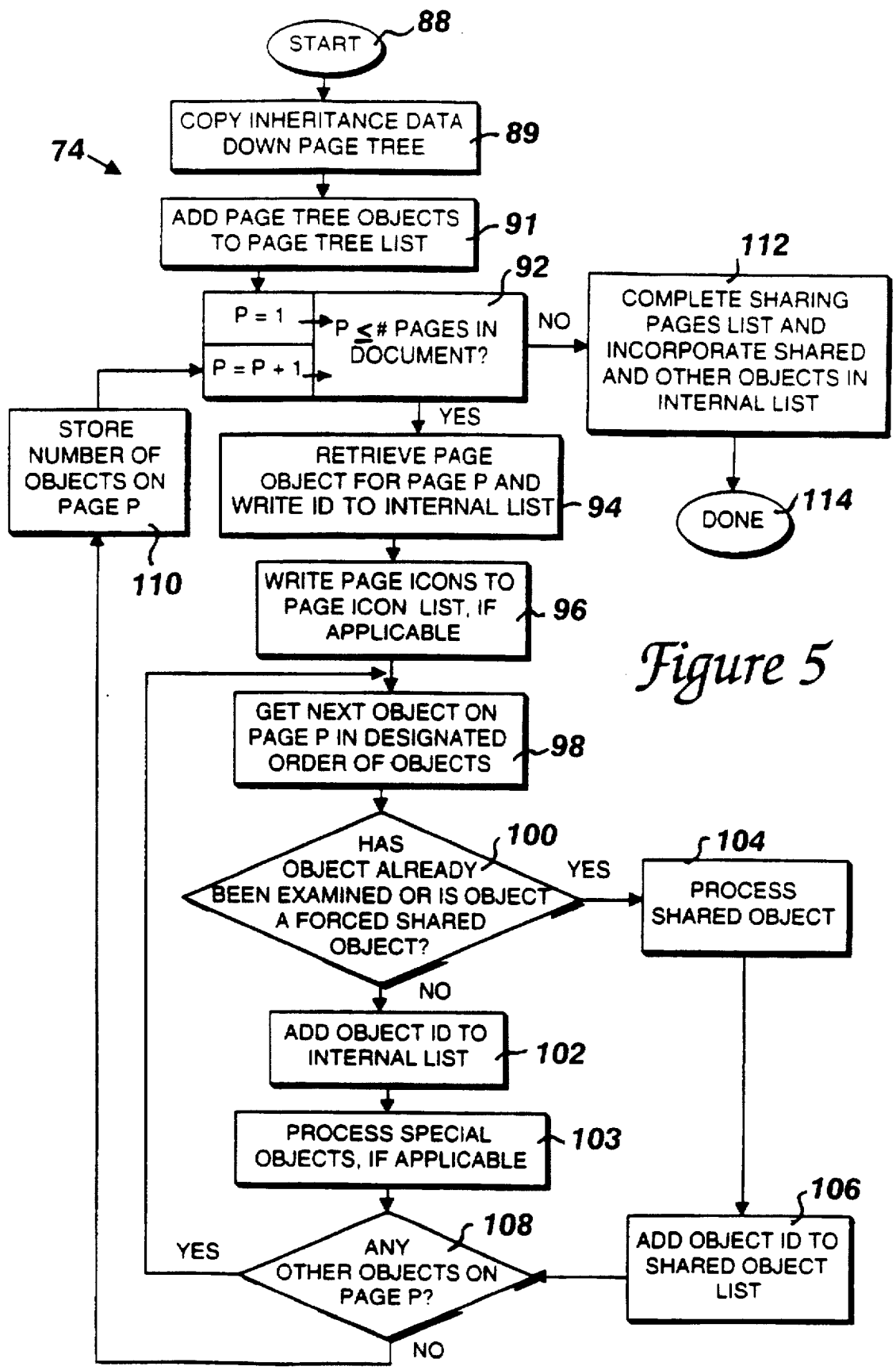
FIG. 5 is a flow diagram illustrating a step of FIG. 4 in which an internal list of objects and lists of shared objects are created.

FIG. 5 is a flow diagram illustrating step 74 of FIG. 4, in which an internal list of objects and lists of shared objects are created from the non-optimized portable electronic document. The process begins at 88. In step 89, any inheritance data from parent objects are copied into children objects down the page tree, as appropriate. This step is implemented if, as in PDF files, some children objects do not include certain needed data and instead refer to and "inherit" this needed data from a parent object, e.g. display commands, orientation commands, etc. Since the present invention re-orders object data and may not be able to easily reference a parent object, any inheritance data from parent objects is copied into children objects that need such data in step 89.

In step 91, the page tree objects are preferably added to a separate page tree internal list, except for page tree objects for the first page. Only the first page's page tree objects need to be initially downloaded in a downloading process, so the other page tree objects can be organized in a separated list in step 91 and, later, written near the end of the file (described below). In step 92, a variable P is initialized to I and checked if it is less than or equal to the number of pages in the document. If so, in step 94, the page object for page P is retrieved from the non-optimized document file (or non-optimized document stored in memory) and is written to an internal list. A page object, as typically defined in a PDF file or similar format, is an object that refers to other objects which are included and displayed collectively on the page. Thus, by retrieving the page object for page P, the process also indirectly retrieves references (pointers) to page P's page contents object and any other referenced objects. Step 94 finds the page object for page P in the non-optimized file by use of the cross reference table from the non-optimized file (which can be utilized by the viewer). The page P object identification (ID) is written to an internal list, preferably stored in RAM 16 or other storage. In PDF and other types of files, an object typically includes an object ID, which is a number or other identifier that uniquely identifies the object within the document file. A number identifier for the page P object is written to the internal list in this described embodiment.

In step 96, if page icons 50 ("thumbnails") are implemented in the viewer embodiment as shown in FIG. 2b, the page icon object for the current page P is typically added to a separate page icon list if the initial displayed view does not include page icons. In viewers such as Acrobat, however, the user can save a file designating the document to be displayed with a page icon view as shown in FIG. 2b when initially downloaded and displayed. If the current non-optimized document has been so designated, the page icon objects are needed to display the first page. Therefore, in one embodiment, step 96 can be skipped and the page icon objects can be added to the internal list after all first page objects have been added (i.e., a negative determination of step 108 for the first page (e.g. P=1)). Alternatively, a page icon for a specific page can be stored after its page contents. Other special objects which are not necessary for displaying the document can also be added to specialized internal lists in step 96 so that these objects can be written to the end of the document file. Herein, "special objects" refer to page icon objects, bookmark objects, page tree objects, and any similar types of objects that are usually not necessary to display a page and can be provided near the end of the optimized document file.

In next step 98, the next object "on" page P is retrieved in a designated order, i.e., the next object referred to by the page P object in the designated order of objects. The "designated order" of objects is the order of objects in which the provider of the optimized file (or the implementor of process 74) desires to be downloaded and displayed when accessing a page from the file. Thus, when downloading the optimized file 62, certain types of objects can be displayed first while other types of objects are still being downloaded. For example, it is typically desirable to display the text (i.e., page contents object) on a page before the images on the page when the page is downloaded, since the user who is downloading the page can read the text while the images are still being downloaded. From the text content, the user can quickly determine if it is worth his or her time to wait for an image to be downloaded and be displayed, or if that page download should be interrupted and a new page downloaded.

In the described embodiment, the designated order of objects is links, non-image "resource objects" (i.e., non-image objects in a resource dictionary), page contents objects, image objects, bookmark objects, user-defined objects, and other objects. This order allows links to be downloaded and active first. Since links are typically implemented as rectangular (or other shaped) "bounding boxes" which enclose text, graphics, images, or other objects, the links are preferably first in the designated order so that when an enclosed object of a link is later displayed, the link will already be receptive to user inputs. Preferably, other types of objects that may be added to a document by a viewer, such as annotations, are ordered with links in the designated order. Non-image "resource objects" are ordered next, which include shared objects such as font objects, color map objects, and the like. Font objects provide the data to determine how text will appear, and color map objects map colors to different display output devices, as is well known to those skilled in the art. The font and color map objects are needed to display text and graphics, and thus should be downloaded close in time to the page contents objects which refer to them. In PDF files, these types of objects are typically located in a "resource dictionary" which is located in the page contents object 56 of a document file (or as a separate object) and is used for decoding page contents to map objects with object references. Image objects can also be referenced in the resource dictionary in typical PDF files; however, they are ordered later in the designated order. The page contents objects (text and graphics) are ordered next in the designated order, which allows a user to quickly download and view the text/graphics and determine the subject content of the page. The image objects are ordered next, near the end of the designated order, since they are usually the largest size objects and require the greatest downloading time. Objects referenced by a bookmark object, as shown in FIG. 2a, are next in the order. These objects should be downloaded so that they can be accessed by the bookmark, and are a special case, as explained below. User-defined objects and any other types of objects are ordered last.

Other designated orders of objects can be implemented in other embodiments. For example, links can be downloaded after text and graphics objects. Alternatively, the user who is creating the optimized file 62 can be offered an option of inputting a desired designated order of objects.

The next object in the designated order of objects is thus retrieved in step 98. That is, if this is the first time step 98 is implemented, a link object is retrieved. Once all the link objects have been retrieved and added to lists in step 102 of the current process, an object next in the designated order (e.g., resource objects) is then retrieved in step 98, and so on.

In step 100, the process determines if the retrieved object has already been examined for a different page or if the retrieved object is a forced shared object. If the retrieved object has already been examined for different page, then this object is designated a shared object, i.e., the object was referred to by an earlier examined page/page contents object or the current page/page contents object and was already retrieved and processed. Any object can potentially be a shared object; for example, a page contents object or an image object in the document file can be referred to by two or more different pages. The process can check if an object is shared by examining the internal list that has been created so far in the current process. If an object ID is found that is identical to the current object's ID, then the object is considered to be a shared object.

Also, in step 100 of the preferred embodiment, if the retrieved object is a forced shared object, then the object is automatically forced (designated) to be a shared object, regardless of whether the object is actually referenced by multiple pages or not. Herein, "forced" shared objects include such resource objects as font objects and color map objects, but do not include resource objects such as image objects or procset objects. Font and color map objects are forced to be shared objects because they are required in the decoding of page contents and are preferably interleaved in the downloading process, described below. "Procsets" are used for printing purposes, as is well known to those skilled in the art, and are preferably not automatically forced to be shared objects (images and procsets can be shared objects if they are referenced by multiple pages).

In addition, the user can provide his or her own non-standard shared objects that can be referenced on multiple pages. For example, a user could provide a dictionary table object in the document that is referenced by multiple pages. Such user-defined shared objects are not necessarily referred to by and are not required to display page contents such as text, and are therefore referred to herein as "non-contents shared objects."

If the retrieved object is not a shared object, then step 102 is performed, in which the object ID of the retrieved object is added to the end of the internal list. The internal list thus has an order of objects including a page object followed by all the objects (in the designated order) referenced by that page.

In step 103, special objects are preferably processed if predetermined conditions are met. For example, in the described embodiment, bookmark 45 objects are a special type of object that are preferably processed in step 103 if the current page is the first page (P=1), and if image objects on the current page have all been processed (i.e., bookmark objects are after image objects in the designated order). If these conditions are met, then the process also checks if the bookmark view 45 is to be displayed when the document is initially opened, i.e. if the bookmark view of FIG. 2a is the default initial view. If so, the ID's of a predetermined number of bookmark objects (e.g., 60) are added to the internal list. This number is the number of bookmark objects that would be initially shown in the bookmark view 45 as shown in FIG. 2a. The remainder of bookmark objects are then added to a separate bookmark internal list, similar to the separate page icon list described above. If the bookmark view of FIG. 2a is not the default initial view, then all of the bookmark objects are added to the separate bookmark list in step 103. This step allows objects displayed in the bookmark view to be grouped with the first page's contents data so the bookmark objects can be downloaded and displayed quickly with first page data in a downloading process (if the initial document display includes the bookmark view). The process then continues to step 108, detailed below.

If the retrieved object is a shared object in step 100, then step 104 is implemented, in which the shared object is processed and a sharing pages list is created. This step is described in greater detail with respect to FIG. 6. In next step 106, the object ID of the shared object is added to the shared object list, which is similar to the internal list except that it includes only shared object ID's of objects that have been examined by process 74.

Figure 5A:
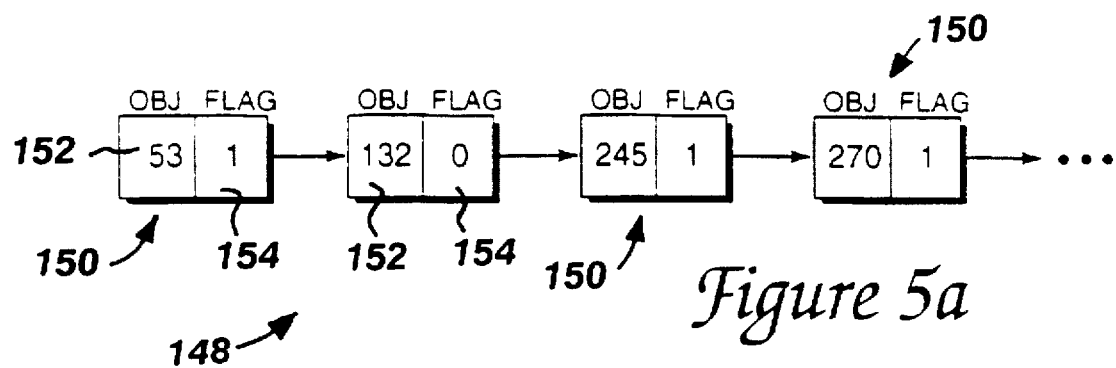
FIG. 5a is a diagrammatic illustration of a shared object list created in the process of FIG. 5.

FIG. 5a is a diagrammatic illustration of shared object list 148 as processed in step 106 of FIG. 5. The shared object list 148 includes a node 150 for each shared object found in the process of FIG. 5. Each node 150 includes an object ID field 152 for storing the an object's object ID, and a contents flag field 154 for storing a contents flag, as detailed subsequently.

After step 102 or step 106, step 108 is implemented, where the process checks if there are any additional objects on page P that have not been examined. If so, the process returns to step 98 to retrieve the next object in the designated order of objects. If there are no additional objects, step 110 is implemented, in which the number of objects on page P is stored in memory. This number can be determined by counting all the newly-added object ID's in the internal list. The process then returns to step 92 to increment the variable P and again check if P is less than or equal to the number of pages in the document.

Once all of the pages of the non-optimized document have been processed by the aforementioned steps, the process continues to step 112, in which a sharing pages list is completed and all sharing objects and other objects are incorporated into the internal list. The sharing pages list is created in the processing of shared objects of step 104. After the shared and other objects have been incorporated into the internal list, then the internal list is ready to be used to write the all of the objects in the optimized order in step 76 of FIG. 4. Step 112 is described in greater detail with respect to FIG. 7. The process is then complete at 114.

Figure 6A:
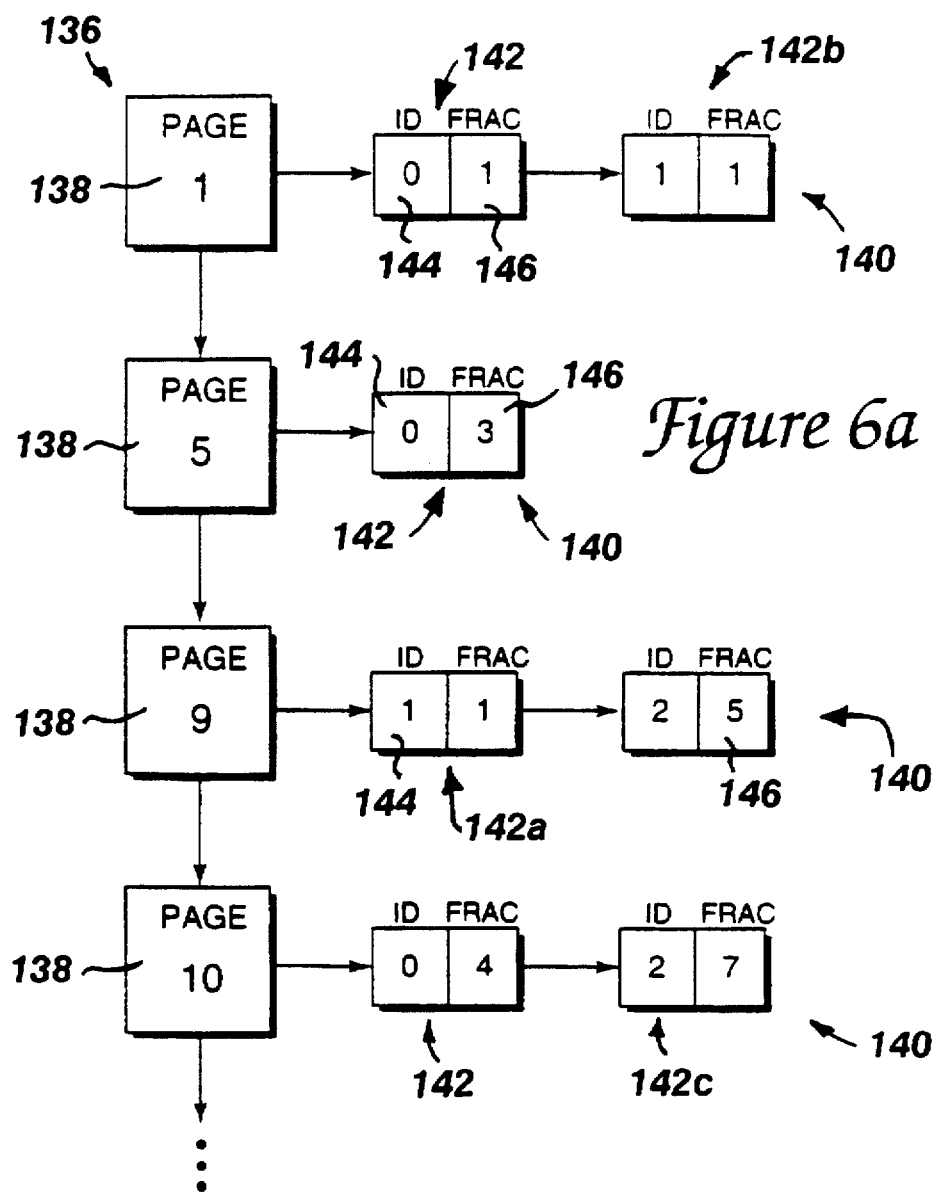
FIG. 6a is a diagrammatic illustration of a sharing pages list created in the process of FIG. 6.
Figure 6:
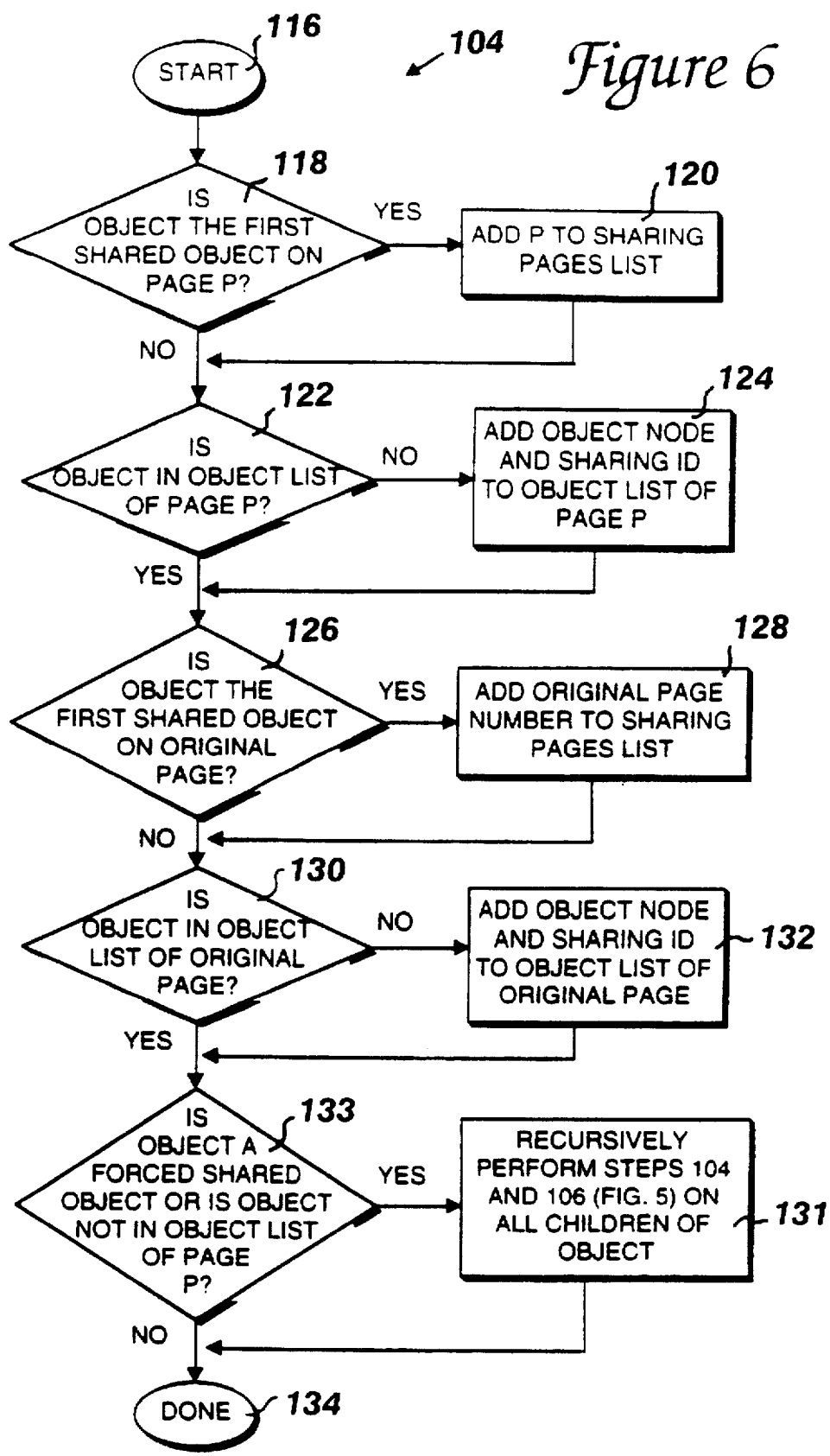
FIG. 6 is a flow diagram illustrating a step of FIG. 5 in which shared objects are processed.

FIG. 6 is a flow diagram illustrating step 104 of FIG. 5, wherein the retrieved shared object is processed. The process 104 begins at 116, and, in step 118, the process checks if the retrieved object is the first shared object on page P. This is determined by checking if page P is already in the sharing pages list. If page P is already in the sharing pages list, then a shared object was already found to be referenced by page P, and step 122 is implemented. If page P is not in the sharing pages list, then, in step 120, page P is added to the sharing pages list.

FIG. 6a is a diagrammatic illustration of a sharing pages list 136 of the described embodiment. This list is created and referred to during the process 104 of FIG. 6. As described, the list is provided as a linked list, the implementation of which is well known to those skilled in the art. Other implementations of the list can also be provided. A page is represented by a page node 138, where each page node is linked to another page node, preferably in sorted numeric order of the pages. If a page node exists in list 136, then that page includes shared objects, as determined by steps 118 and 120 of FIG. 6.

Referring back to FIG. 6, if the object is not the first shared object referenced by page P, or after step 120, then step 122 is implemented. In step 122, the process checks if the retrieved object is in the object list of page P. As shown in FIG. 6a, an object list 140 is referenced by a page node 138 if that page references shared objects. An object list 140 includes a number of object nodes 142, each of which represents a shared object referenced by the page of the corresponding page node. In step 122, the process checks if the retrieved shared object is already in the object list 140 of page P. If such a condition exists, it indicates that multiple references to the shared object are present on page P. Since only the first instance of the shared object on a page is needed for the present invention, step 126 is then implemented, as detailed below. If, however, the retrieved object is not in the object list 140 of page P, then, in step 124, an object node 142 is added to the object list 140 and a sharing ID is added to an ID field 144 of the object node (object node 142 also includes a fraction field 146, detailed below). The "sharing ID" is an identifier for the object which uniquely identifies the object in the sharing pages list. Preferably, the sharing ID is a number, n, that indicates a shared object is the nth shared object that has been found in the document. For example, a sharing ID of "0" indicates that an object is the first shared object found in the document, a "1" is the second shared object found, etc. The sharing ID is not the same as the object ID, since an object ID, m, preferably indicates that the object is the mth (shared or non-shared) object in the document. Preferably, object node 142 and the sharing ID are added to the object list 140 in a sorted numerical order according to sharing ID's.

Step 126 is then implemented, in which the process checks if the retrieved object is the first shared object on the original page, i.e., if the original page is already in the sharing pages list 136. The "original page" is any other previous page that also references the shared object. There may not be an original page if, for example, the retrieved shared object is a forced shared object (e.g. a font). The process determines the original page by, for example, checking a table which logs each object and the page that each object is located on. If the retrieved object is not the first shared object on the original page, then step 130 is performed, detailed below. If the retrieved object is the first shared object on the original page, then in step 128, a page node 138 corresponding to the original page is added to the sharing pages list. New nodes are preferably added to list 136 in a numerical sorted order by page number. For example, a shared object designated by node 142a is found on page 9, and is assigned a sharing ID of "1". Page 1 also includes the same object, so that node 142b is added to the object list 140 of the page node for page 1. The process then continues to step 130.

After a negative determination of step 126, or after step 128, step 130 is performed, in which the process checks if the retrieved object is in the object list(s) 140 of the original page(s). This step is substantially similar to step 122, above. If the object is already in the original page's list 140, then the process continues to step 133, described below. If the object is not in the original page's list 140, then, in step 132, an object node and sharing ID for the retrieved object is added to the object list 140 of the original page. The process then continues to step 133.

In step 133, the process checks if the retrieved object is a forced shared object or if the object is not in the object list of page P. If either condition is true, step 131 is performed, in which steps 104 and 106 of FIG. 5 are recursively performed for all of the children objects referenced by the retrieved object (if any), including children objects of other children, etc. This step forces children objects of parent shared objects to also be shared. Such children objects can include, for example, widths of characters for a custom font, etc. After step 131, or if neither of the conditions of step 133 are true, then the process is complete at step 134.

Steps 118–124 can be implemented as a function which examines an object passed to the function through a function call. This same function can then perform steps 126, 128, 130, and 132 by passing the original page to the function through a second call.

Figure 7:
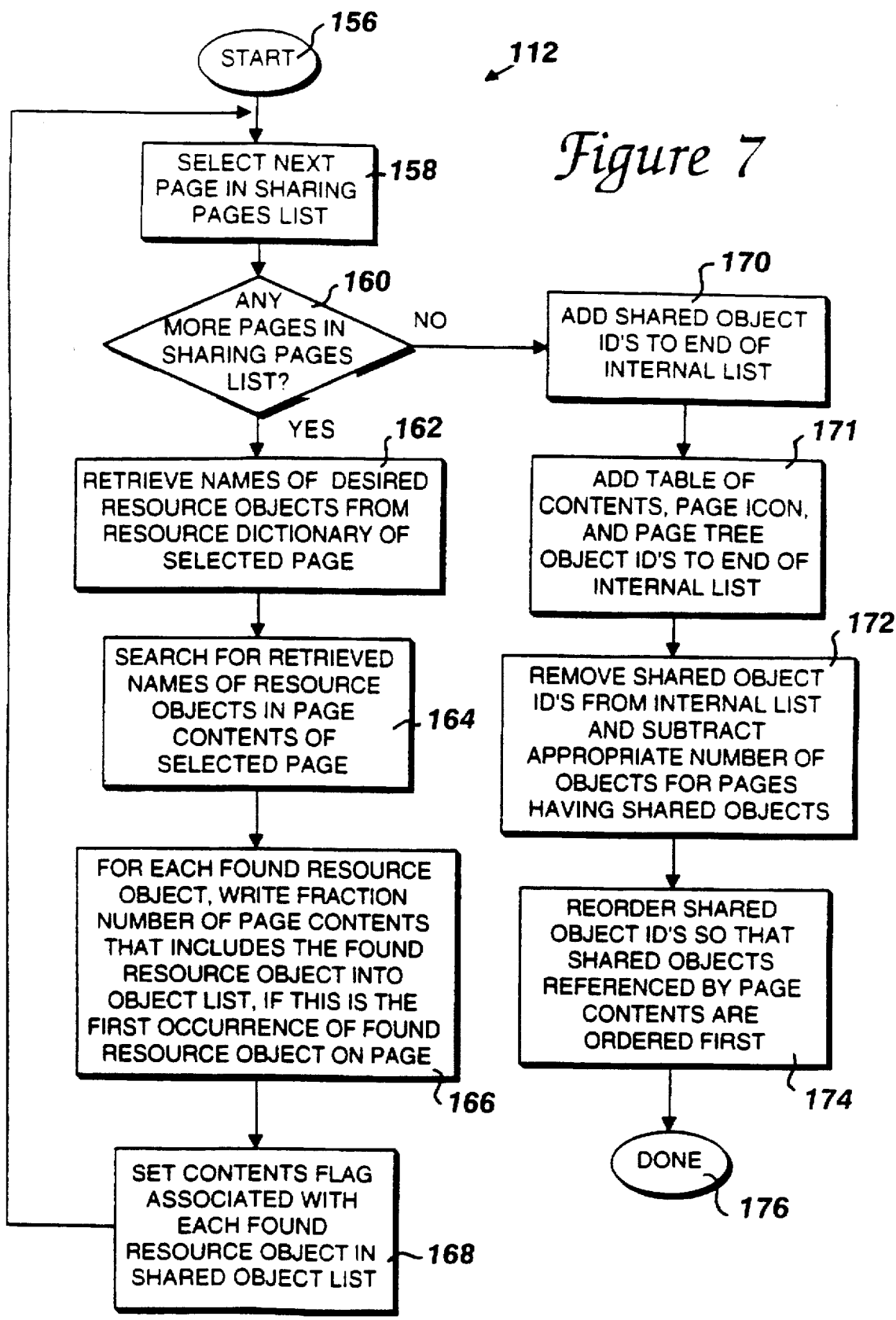
FIG. 7 is a flow diagram illustrating a step of FIG. 5 in which the sharing pages list in completed and shared objects are incorporated into the internal list.

FIG. 7 is a flow diagram illustrating step 112 of FIG. 5, in which the sharing pages list is completed and shared and other objects are added to the internal list. The process 112 begins at 156. In step 158, the next page node 138 in the sharing pages list 136 is retrieved. If this is the first time performing step 158, then the first page node in the list 136 is retrieved. In next step 160, the process determines if there are any more page nodes in the list 136 to examine, e.g., if a null or end of list symbol was retrieved in step 158 to indicate all page nodes have been examined. If there are no more page nodes to examine, step 170 is performed, detailed below. If a new, unexamined page node was retrieved in step 158, then, in step 162, the names of the resource objects which are also shared objects for the selected page are retrieved from the resource dictionary utilizing shared object list 148 (a resource dictionary is typically associated with each page object). Only certain types of resource objects are retrieved which are desired to be interleaved in the downloading process. In the described embodiment, these desired resource objects include font objects, color map objects, and (shared) image objects. Each resource object typically has a "name", which is an identifier for the object so that it may be referenced to the actual object data. For example, font objects can have a name such as "f1" or "f2" which references a particular font object for the font of "Helvetica", "Times", etc.

In next step 164, the process searches for the retrieved shared resource object names in the page contents portions of the selected page. For example, if page 9 is the selected page, the process accesses the page contents of page 9 and searches for names (such as "f1") from the resource dictionary found in step 162. In step 166, for each found resource object, the fraction number of the page contents that includes the found resource object is written into the object list, if this is the first found occurrence of the resource object on the page. The "fraction" of the page is a portion of the page contents having a predetermined size. For example, the fractions can be designated a size of eighths, such that a fraction is ⅛ the size of the page contents. Larger or smaller fractions can be designated in other embodiments. The fraction size is used when interleaving and can depend on the desired amount of page contents data to be downloaded before the shared objects referred to by that contents data are downloaded, as explained subsequently. When a resource object's name is found in the page contents, the process has found a reference or pointer to the resource object. For example, text in the page contents may include an identifier referring to a font object. The particular fraction of the page contents in which the resource object was named is then written into the object list 140 of the current page node. This fraction number is written into fraction field 146 of an object node 142 and is the dividend of the fraction, with the divisor being a predetermined number. For example, for object node 142c of list 136 in FIG. 6a, a fraction number (dividend) of "7" indicates that this shared object occurred in the ⅞ portion of the page contents of page 22, i.e., if the page contents were divided into eighths, the object would occur in the seventh eighth, where "8" is the predetermined divisor. A fraction number is similarly written for each resource name searched and found on the page. Also, the fraction numbers written into parent shared objects are also written into any children objects of those parent shared objects (children objects are described in step 131 of FIG. 6) so those children can be interleaved with the parent objects. Preferably, image resource objects are automatically assigned the highest possible fraction number, since it is preferred that images are downloaded last in an interleaved downloading process, as described below.

Also in step 166, the nodes of each object list 140 are preferably reordered so that the shared objects are provided in an order from first to last occurrence on the page. The exception to this step is image objects, which are ordered from first to last occurrence separately from other shared objects on the selected page and are added to the end of the object list for the page.

In step 168, the contents flag associated with each found resource object is set in the shared object list 148. As shown in Figure 5a, the flag field 154 holds the contents flag for each shared object. This flag is set to "1" if the shared object was found in step 166. The contents flag indicates which shared objects should be interleaved with page contents when the optimized file is downloaded, as explained subsequently. Shared objects that do not have the contents flag set will not interleaved in the downloading process of FIG. 10 (e.g., non-contents objects, even if shared, do not have the contents flag set, such as user-defined objects, procsets, resource dictionaries, etc.).

After step 168, the process returns to step 158 to retrieve another page node 138 from sharing pages list 136. Once all the page nodes have been examined, the process continues from step 160 to step 170, where the shared object ID's from the shared object list 148 are appended to the end of the internal list. In step 171, the bookmark objects on the bookmark internal list, page icons on the page icon internal list, page tree objects on the page tree internal list, and any other required objects are added to the end of the main internal list. In next step 172, any duplicate shared object ID's in the front portion (i.e. portion before the shared objects portion) of the internal list are removed from the internal list. The shared object ID's in the shared object list 148 are compared to the object ID's in the front portion of the internal list, and any matches from the internal list are removed. In addition, in step 172, the total number of objects for a page is decreased by the amount of matched objects so removed. In step 174, the shared object ID's are preferably reordered, using the contents flags set in step 168, so that shared objects referenced by page contents are ordered first. This order allows the contents shared objects to be grouped and the page offset table to require less storage space than if the shared objects were not reordered. The process is then complete at 176.

Figure 8:
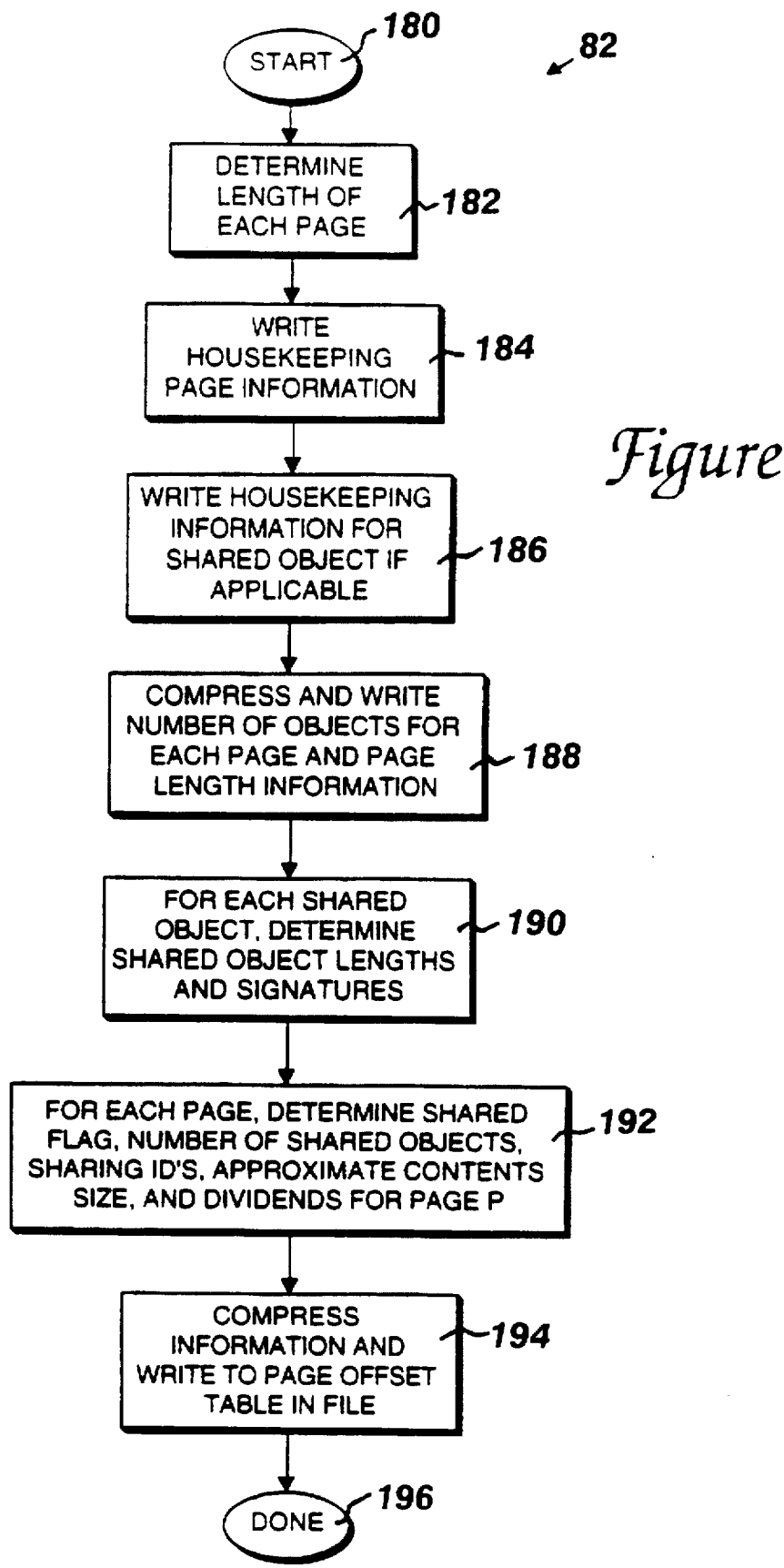
FIG. 8 is a flow diagram illustrating a step of FIG. 4 in which a page offset table of the present invention is placed in the optimized file.

FIG. 8 is a flow diagram illustrating step 82 of FIG. 4, in which the page offset table of the present invention is developed and stored in the optimized document file. The process of FIG. 8 generates one example of a page offset table, which can have other formats and forms in alternate embodiments. The process begins at 180, and, in step 182, the process determines the length of each page, preferably in bytes or an similar measure of information. This can be determined by examining the number of objects on a page and determining the byte offset amount between the first object on the page and the first object of the next page. In step 184, housekeeping information is written into the page offset table 68. An example of a page offset table 68 as referred to by process 82 is shown in FIG. 8a. The housekeeping information can include the number of pages in the electronic document, the least number of objects on a single page, the location of the cross reference table (e.g., the offset in bytes from the beginning of the file), and the number of shared objects in the document. This housekeeping information is used to create page information to help download portions of the document, as detailed in the downloading process of FIG. 10.

If there are shared objects in the file, then shared object housekeeping information is written to the page offset table in step 184. The shared object housekeeping information includes the number of non-contents shared objects in the document, the least size of a shared object, and the size of the dividend for the fraction size (e.g., 3 bits).

In step 188, the number of objects on each page as determined in step 110 of FIG. 5 and step 170 of FIG. 7 and the page length information as determined in step 180 are compressed and written to the page offset table, shown as information 189 in FIG. 8a. In step 190, for each shared object in the document, the length of the shared object (e.g. in bytes, determined by offset comparison) and the signature for the shared object (if applicable) are stored in the page offset table. The signatures for shared objects are identifiers which allow the shared object to be used for caching during the downloading process. For example, the shared object can be stored in a disk cache after it is first downloaded so that it can be available in memory whenever that shared object is accessed or referenced by page contents in the same or different document file.

Next, in step 192, for each page P of the document, additional information is determined and collected for compression for page P, including a shared object flag, the number of shared objects on page P, sharing ID's, approximate page contents fraction information, and the divisor value used for the fraction size. The shared object flag indicates that a page P references shared objects. Shared object ID's are stored for the shared objects being used by that page. The approximate contents fraction information is estimated from the sizes of page contents objects as a fraction of page length; e.g., this approximate fraction can be designated as "⅛". The divisor value is, for example, "8" if the fraction size is determined to be eighths. After the information in step 192 has been determined for each page of the document, the process continues to step 194, where the information for all the pages is preferably compressed by well-known techniques and written to the page offset table in the optimized document file 62. The process is then complete at 196.

The page offset table 68 is intentionally made small and compact in size, where data is compressed when possible. Since the page offset table is additional data that is not normally downloaded in non-optimized documents, it is desirable that the additional data be a small as possible so that the user does not have to wait any extra length of time. In addition, since the page offset table is compact, it is less "noticable" (through time delays) in a downloading process than other much larger structures, such as the "page tree" normally included in a PDF document.

In alternate embodiments, the page offset table can include different or additional data, or the data can be stored in different formats. For example, the sharing pages list 136, internal list, and other lists generated can be stored directly (and inefficiently) in the page offset table in some embodiments.

Figure 9:
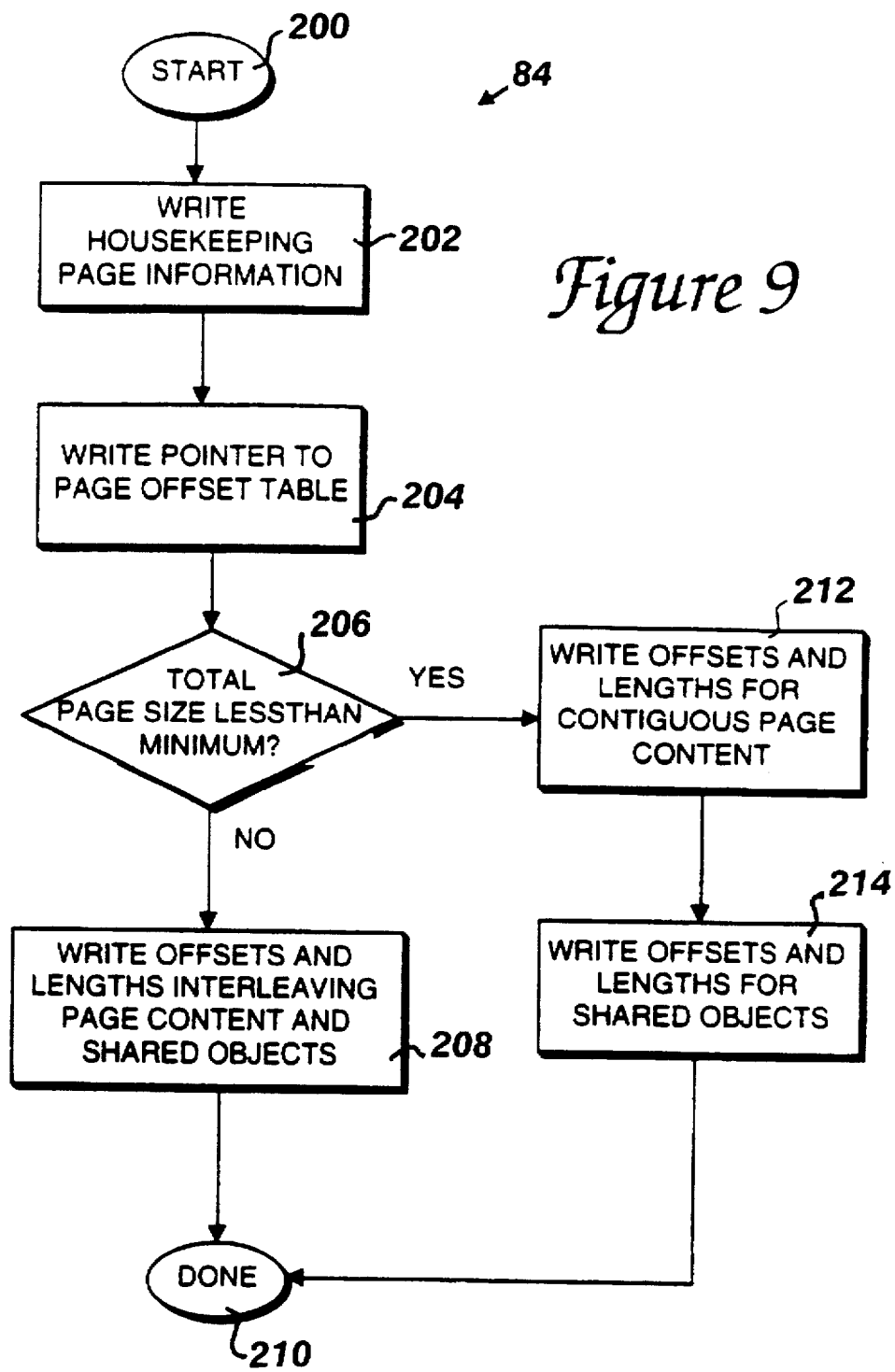
FIG. 9 is a flow diagram illustrating a step of FIG. 4 in which a range table is written into the optimized file.

FIG. 9 is a flow diagram illustrating step 84 of FIG. 4, in which a range table 66 for page one of the electronic document is written at the beginning of the optimized document file. The range table provides information so that the page one data of the electronic document may be located in the optimized file and quickly downloaded and displayed. It is assumed that page one is the "first page", i.e., desired to be displayed first, as a default, when beginning to download a page-based electronic document. In other embodiments, a different page can be the default first page that is displayed.

The process begins at 200. In step 202, housekeeping information is written to the range table. This housekeeping information is similar to the housekeeping information described with reference to the page offset table above. FIG. 9a shows a diagrammatic illustration of a range table of the present invention. The housekeeping information includes the number of ranges of data that are downloaded for the first page. These ranges can include interleaved portions of page content and shared objects (described below). The shared pages list 136 can be referenced to determine how shared objects are to be interleaved with page content by examining the fraction numbers in the object nodes 142 and appropriately interleaving the shared objects with the page content. Alternatively, no interleaving is applied, and the first range is an entire page contents object 56, while any additional ranges are shared objects referenced by the page contents. A version number for the range table/page offset table in the current file is also preferably stored as housekeeping information. Also, a signature flag for each range can indicate if the range (object) has a signature; the signatures can also be listed in the range table. Signatures can be used for caching shared objects, as described above.

In step 204, a pointer to the page offset table 68 is written into the range table. This pointer allows the page offset table to be located in the optimized file and downloaded after the range table and first page have been downloaded. In next step 206, the process checks if the total first page size is less than a predetermined minimum size. If the page is less than the minimum size, then no interleaving of page contents and shared objects is desired, since the page contents are so small that no advantage in downloading speed may be gained by the interleaving; in fact, the downloading speed may be slower when the page is below the minimum size and interleaving is provided, creating a longer wait for the user to view the page on the display screen. Interleaving of page contents and shared objects is described in greater detail with respect to FIG. 12. For example, a minimum size of 4 kilobytes can be specified.

If the page is more than the minimum size, then, in step 208, the offsets and lengths of the page content are written into the range table interleaved with the offsets and lengths of the shared objects. That is, if a fraction of the page contents includes a reference to a shared object, the referred shared object is ordered after that fraction of the page contents in the range table. The interleaved ranges determined in the housekeeping information in step 202 can be used. The process is then complete at 210.

If the page is less than the minimum size in step 206 (or if no interleaving is desired for a different reason), then step 212 is implemented, in which the offset and length for the entire page contents are written to the range table, so that one offset and one range describe the page contents. In next step 214, the offsets and lengths for the shared objects, and, preferably, the offsets/lengths for the cross reference table entries needed for those shared objects, are then written to the range table. They can be written, for example, in the order they have been stored in the object list 140. The process is then complete at 210.

Alternatively, other conditions can also be checked to adjust the arrangement of page content and shared object offsets in the range table. For example, if the page contents object is less than 3 kilobytes in size, then shared objects offsets can be placed after the page contents data with no interleaving.

DOWNLOADING AN OPTIMIZED DOCUMENT FILE

Figure 10:
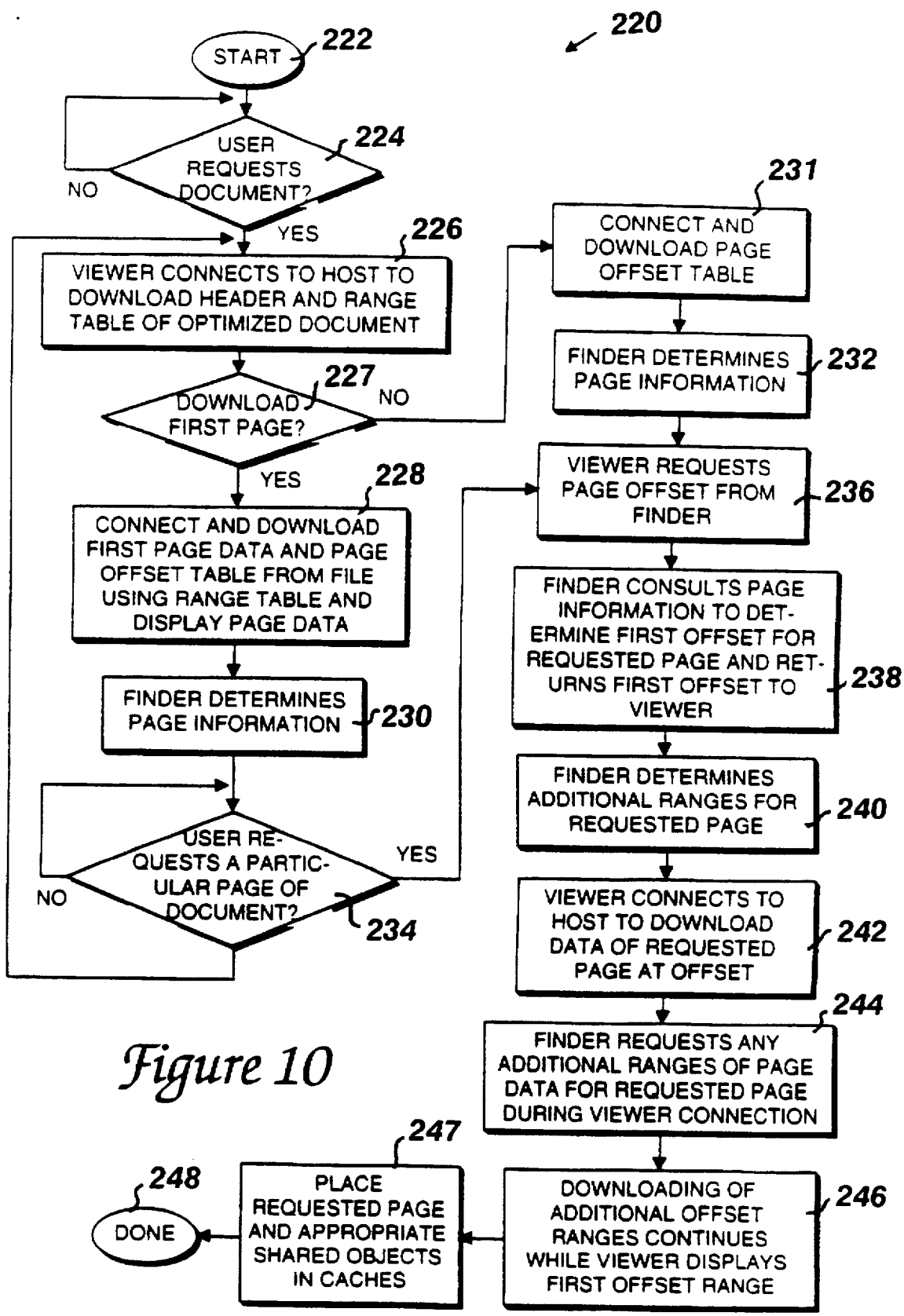
FIG. 10 is a flow diagram illustrating a process of the present invention for downloading pages from an optimized document file.

FIG. 10 is a flow diagram illustrating a process 220 of downloading an optimized pagebased document of the present invention from a host computer to a client computer system 10. It is assumed the user wishes to view the document in a viewer that can display a page or a portion of a age of the document. The "finder" described in the current process can be implemented within the viewer, or as a separate procedure or program instructions running simultaneously with the viewer on computer system 10.

The process begins at 222. In step 224, the process checks if the user has requested to view a document that is located, appropriate to the present invention, on a host (source) server or computer. If no request for a document is made, the process waits for such a request (the computer system 10 or viewer can be performing other tasks for the user in the meantime, such as viewing local documents). When the user requests to view a downloaded document, the viewer connects to the host computer in step 226 to download the header and the range table 66 for the optimized document file. The header includes information designating the file in a specific format, e.g., PDF, and the presence of the range table preferably indicates the file is an optimized file. The header and range table are located at the beginning of the file so that they may be downloaded first. Other needed information is also downloaded at this time; for example, PDF viewers may require a pointer to the contents of the file that is located at the end of the file. In the alternate embodiment in which the first page's contents are stored in an interleaved order in the optimized file, the range table need not be downloaded, and step 226 can be omitted.

In step 227, the process checks if the first page of the documents has been requested to be viewed by the user in step 224. In one embodiment of the invention, when a user first requests to view a document, the first page will be automatically downloaded and displayed as a default. The user then requests a desired page after the first page has been downloaded, as detailed below. However, in other viewer embodiments, a user may be able to initially request to view a particular page of a new document before any part of the document is downloaded. In such an alternate embodiment, step 231 is implemented, described subsequently. If the first page is always initially displayed, or the user requests the first page, step 228 is implemented.

In step 228, the first page data and page offset table is downloaded from the source file by the viewer in another connection using the range table, and the first page is displayed. This first page data includes page contents and shared objects of the first page. The portion of the cross reference table for the first page is also downloaded at this time. The shared objects and page contents of the first page were preferably already interleaved using offsets in the range table, as described with reference to FIG. 9. Thus, a portion of the page contents are downloaded, followed by any shared objects referenced by that portion (and cross-reference data for those shared objects), which allows that portion to be immediately displayed to the user. The user thus experiences very little waiting time to view at least some of the contents of first page. The page offset table 68 is also preferably downloaded during this connection using the pointer in the range table 66 after the first page is downloaded. Thus, the page offset table is downloaded "early" in the downloading process, i.e., immediately after (or, alternatively, before) the downloading of the first page, so that other pages in the document can be randomly accessed and viewed. In some embodiments, the viewer may be selected to not display the first page when downloading a document.

In next step 230, the page offset table is examined to determine page information. The finder is preferably responsible for examining and processing the page offset table. The finder determines "page information" using information in the page offset table. The process of determining this page information is described in greater detail with reference to FIG. 11. The process then continues to step 234.

In step 234, the process checks if the user requests to view a particular page of a document in the viewer. The user can request a page of the current document that was partially downloaded in steps 226, 228 and 230 (or step 226, 231 and 232) or a different document (described below). For example, to request a page of the current document, the user can select a page icon 51 as shown in FIG. 2b to display a different page of the current document. Or, the user can select a link to a different page in the current document or select a bookmark object listed in the bookmark view 45 as shown in FIG. 2a. If no request to display a different page of a document is made, then the process continues to wait for such a request at step 234 (other viewer or computer functions can be performed during step 234). If a request of the current document is made, the process continues to step 236, described below.

In step 234, the user may also be able to request a page of a different document that has not yet been downloaded. For example, a link or other control in the viewer may be selected to provide access to a different document file available on the same or different host computer system. If the user requests a page of a different document in step 234, then the process returns to step 226 to download initial portions of the different document.

Step 231 is implemented after step 227 if a particular embodiment of process 220 allows a user to select a particular page of a new document to download and view, where no portion of that document has been previously downloaded. The header and range table of the document were downloaded in step 226. In step 231, the viewer connects to the host computer and downloads the page offset table from the optimized document file. The page offset table is needed to determine the location of the requested page in the document file. In step 232, page information is determined for the document, similar to step 230 described above (and described with reference to FIG. 11). The process then continues to step 236, as described below.

Figure 11:
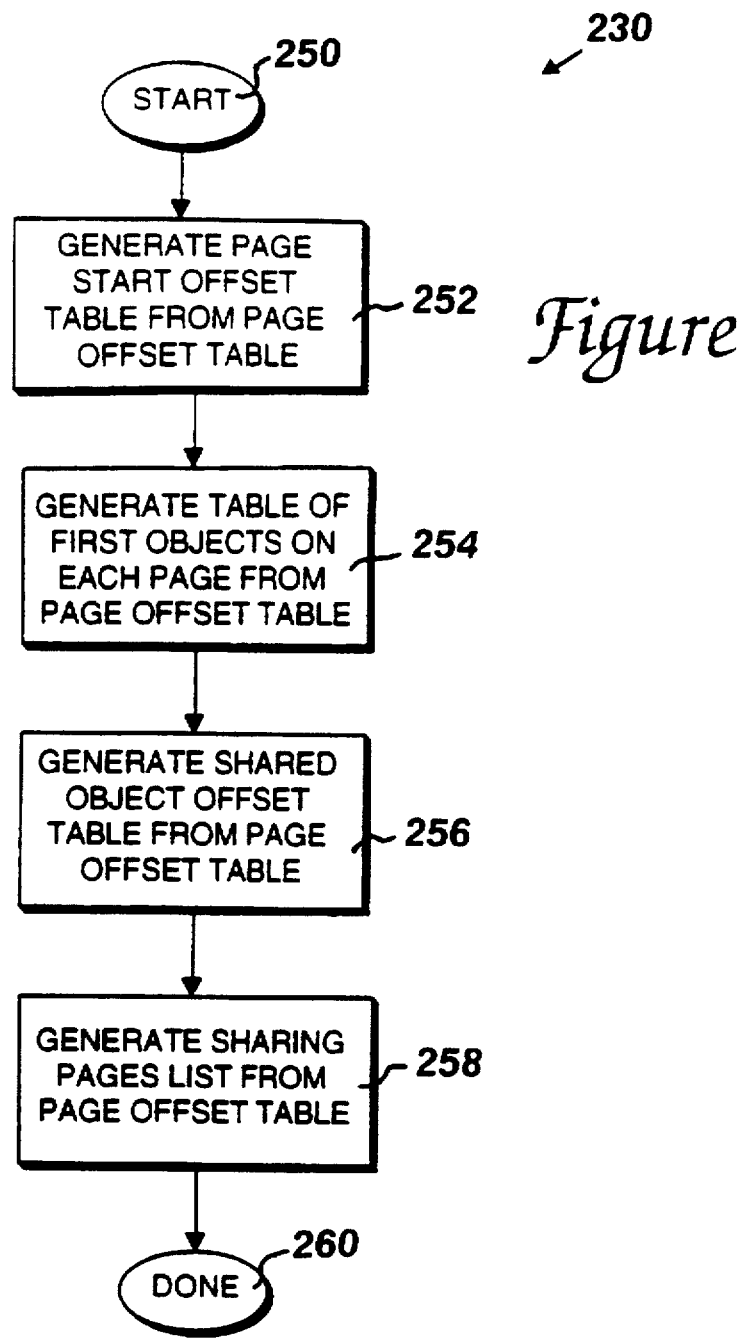
FIG. 11 is a flow diagram illustrating a step of FIG. 10 in which a finder retrieves the page offset table from the document and determines page information.

In step 236, the viewer requests a page offset from the finder so that the viewer can download the appropriate data. In step 238, the finder consults a page start offset table of the page information, which was created in step 230 or step 232 (as shown in FIG. 11), to determine the first offset for the page requested by the user. Alternatively, the viewer can request a specific object rather than a page, and the finder can consult the table of first objects on a page (also created in step 230 or 232) to determine at which offset the object is located in the document file. The found first offset for the page is returned to the viewer in this step.

In step 240, the finder determines any additional ranges of data that are required to completely download and display the requested page, such as additional page contents and any shared objects for the page contents. The finder determines these additional ranges from the page information generated in step 230 or 232. If additional ranges of data are needed (as is typically the case), the page information indicates where the appropriate ranges are located in the optimized document file. In step 242, the viewer connects to the host computer to download the data of the requested page located at the first offset returned by the finder. Typically, the viewer downloads a predetermined amount or "block" of data, such as one kilobyte (K), at one connection.

In step 244, the finder requests any additional ranges of data for the requested page during the viewer connection. The finder may interleave particular shared objects in portions of the page content data in this request to provide a faster display of the page data for the user. Step 244 is described in greater detail with respect to FIG. 12.

In step 246, the downloading of the additional ranges requested by the finder continues as a "background" process while the viewer processes the data already received. Once enough data is received by the viewer to display at least some page data, that data is displayed. The additional offset ranges are preferably stored in a local buffer before being requested by the viewer, such as in RAM and/or on disk. When the viewer requests data after the first block, it receives the data from the local cache rather than from the source file.

Other objects in the document file can be downloaded at later times when appropriate. For example, special objects such as page icons or bookmark objects can be downloaded if the user changes to an appropriate view in the viewer, scrolls to see more bookmark objects in a bookmark view, etc. Page tree objects can be downloaded if the viewer wishes to access such objects.

In step 247, the process preferably places the requested page in a page cache implemented, for example, in local memory such as RAM 16 or on a hard disk or other storage device. This allows a previously-downloaded page to be quickly retrieved and displayed from the cache if the user should desire to view that page at a later time. Also in step 247, the process can place any appropriate shared objects that have been downloaded (and the signatures of the shared objects) into a "shared object cache" implemented, for example, in local memory such as RAM 16 or hard disk. These cached shared objects can be used when downloading and displaying page content of other documents as well other pages of the current document that reference these shared objects. The downloading of redundant copies of the cached shared objects from a document file thus can be avoided to speed up the downloading process. Preferably, the shared objects can be stored in the cache over multiple downloads or even when computer system 10 is powered down (using battery backed RAM or other nonvolatile storage devices). The process is then complete at 248.

The downloading process of the present invention allows a particular page desired by the user to be downloaded without downloading other pages in the document. This allows a speedier download since only the data for the page is downloaded, not the entire document file. In addition, new desired, randomly-accessible pages of the document can be readily downloaded using the page offset table, giving the user the illusion that the entire document is easily available and accessible through simple commands such as "display next page" or "display page number X."

Figure 11A:
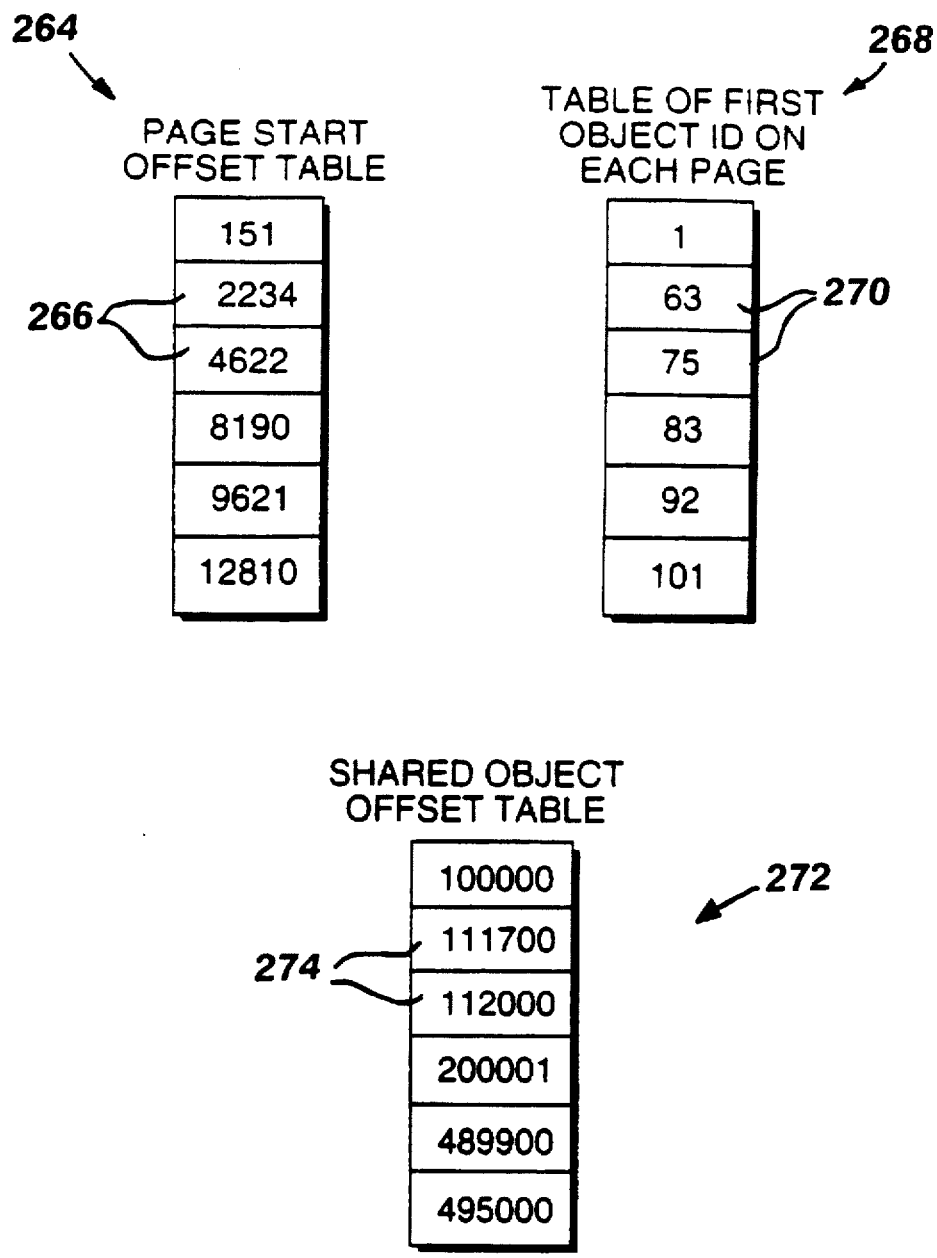
FIG. 11a is a diagrammatic illustration of page information tables developed in the process of FIG. 11.

In prior art processes, when additional data for the page beyond the first 1K portion (or whatever sized portion is being used) is to be downloaded, an additional connection must be made for each additional 1K portion, which can cause delays in displaying the page data. Connecting to a host computer over a network can be a lengthy process, since the host must be located over the network and appropriate handshaking signals must typically be sent and received, and the host computer/server may be busy. In the present invention, however, the finder requests the additional ranges during the same connection that the viewer is requesting the first range, downloads the additional ranges as a background process, and stores the additional ranges in a local buffer. These additional ranges can be provided directly from the buffer to the viewer when the viewer requests additional 1K ranges. Thus, no additional connections to the host are required at a later time to download more data for the page. By avoiding multiple connections to the host in the present invention, the page data is downloaded and displayed much more quickly for the user. As an analogy, this one connection downloading process can be compared to going to a grocery store to buy grocery items, and buying all of the needed items on one trip rather than having to take multiple trips to buy items that were not bought on the first trip. The multiple trips are much more inefficient in the time involved than the single trip. FIG. 11 is a flow diagram illustrating step 230 of FIG. 10, where the finder generates page information from the page offset table. The page information is to be used by the finder to request additional ranges of page data when the viewer is downloading page data. The process begins at 250, and, in step 252, a page start offset table is generated from data in the page offset table. The page start offset table includes the starting offset, e.g. in bytes, for the page contents of each page in the electronic document. More specifically, information in the page offset table such as the number of pages in the document, number of objects on a page, length of a page, etc., are used to create the page start offset table. Referring to FIG. 11a, a page start offset table 264 is shown, where each entry 266 is the starting offset for each page's contents. The length of a page's contents (and shared objects) can be determined by taking the difference between the page's starting offset and the next page's starting offset, since all of the contents of the page were arranged contiguously in the optimized file creation process of FIG. 4.

In next step 254, a table that includes the object ID of the first object on each page is generated from the information in the page offset table. This table is generated from the number of objects on each page in the page offset table (this information can be decompressed from the page offset table using the size in bits to represent the number of objects on a page—fourth entry in page offset table—as is well known to those skilled in the art. Other information in the page offset table can be decompressed similarly.) As shown in FIG. 11a, the table 268 of the first object on each page includes an entry 270 for each page, where the object ID of the first object on the page is stored. The entries 270 of table 268 correspond to the order and number of starting offset entries 266 in table 264, so that a page can be indexed similarly in either table 264 or 268. Table 268 can be used to reference objects if the viewer asks for a page's starting offset based on an object ID rather than a page number. The page number for an object can be found in table 268, and the starting offset of the page then can be referenced in table 264.

In step 256, a shared object offset table is generated from the page offset table. The shared object offset table includes the starting offsets, e.g. in bytes, for each shared object in the document. The shared object offsets are preferably stored in this table in the order of shared objects as stored in the document file. As shown in FIG. 11a, shared object offset table 272 includes entries 274 for storing the shared object starting offsets in the document file. The shared object offset table can be generated from the information in the page offset table, such as the lengths of shared objects, number of shared objects, least size of a shared object, and the location where the shared objects start (which can be calculated from the last page offset (from table 270)+ last page length in the page offset table).

In next step 258, the sharing pages list 136 is generated from the page offset table information. This list 136 is stored in memory, such as RAM 16, of the client computer system 10, and includes substantially the same nodes as shown in FIG. 6a. From list 136, the finder can determine which pages refer to which shared objects, the fraction of the page content in which the shared objects are referenced, and the sharing ID's of the shared objects so that the starting offsets for the shared objects can be referenced in shared object offset table 272. The list 136 can be generated from the shared object flag, fractions, and sharing ID's in the page offset table. The process is then complete as indicated at 260. In other embodiments, page information can be organized in different ways, or can be directly used from a page offset table.

Figure 12:
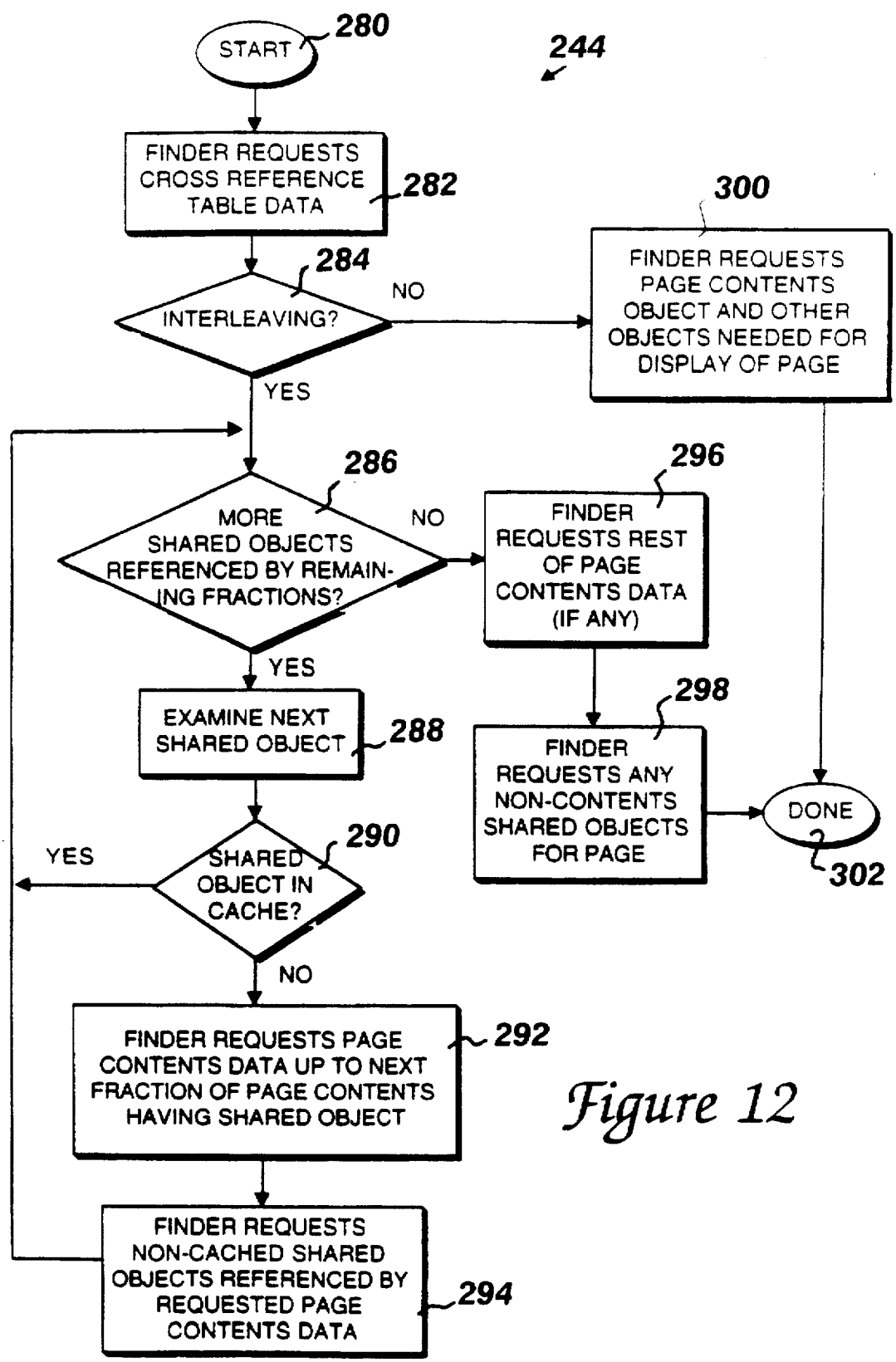
FIG. 12 is a flow diagram illustrating a step of FIG. 10 in which the finder requests any additional ranges of page data for a requested page during a viewer's connection with a host.

FIG. 12 is a flow diagram illustrating step 244 of FIG. 10, in which the finder requests any additional ranges of page data for the requested page during the viewer's connection with the host computer. The process begins at 280. In step 282, the finder requests cross reference table data for the page contents object from the document file at the host computer for the requested page. The cross reference data allows the viewer to determine the offsets for objects other than the first object on the requested page. In next step 284, the process checks if interleaving should be performed on the downloaded page data. Interleaving, as described above, is the insertion of certain shared objects after portions (or "fractions") of page contents data that refers to those shared objects. This speeds up the display of portions of a page, since the shared objects required for displaying a portion of page contents are downloaded right after that portion is downloaded.

If no interleaving of page data is desired, the process continues to step 300, described below. If interleaving of the page data is desired, the process continues to step 286, where the finder checks if there are more shared objects referenced by any remaining fractions of the page contents object in the document file by checking sharing pages list 136. If so, then process continues to step 288, where the next shared object is examined from the appropriate object list 140 in the sharing pages list 136. If a sharing object cache is being implemented, step 290 is performed, in which the process checks if the examined shared object is in the cache. For example, the finder can compare the signatures of shared objects in the shared object cache with the signature of the examined shared object. If the examined shared object is already in the cache, then this shared object was previously downloaded when a different document was downloaded, and thus need not be downloaded during the current process. Thus, the process returns to steps 286 and 288 to examine the next shared object in object list 140.

If the examined shared object is not in the cache, step 292 is performed, where the finder requests a range of page contents data from the start of the remaining portion of page contents to the end of the fraction of page contents that references the examined shared object. The process determines that fraction by examining the fraction field 146 of the examined shared object in the object list 140 (which is the dividend of the fraction). The divisor of the fraction is known from the page offset table 68. An actual fraction size of page contents (in bytes) can be calculated by deriving an approximate page contents size from the page length and approximate page contents fraction (in the page offset table), and dividing the approximate page contents size by the divisor. For example, if a fraction divisor of 8 is used, the next eighth of the page contents is requested by the finder in step 292 if the examined shared object is referenced by this eighth. If the examined shared object is referenced by the sixth eighth of page contents, then all the page contents data (in the page contents object) up to and including the sixth eighth is requested by the finder. Thus, any fractions of page contents that do not reference a shared object in the object list are combined until a shared object is found in the object list, at which time the request for the entire range of combined fractions is sent to the host computer.

The shared objects in an object list 140 are provided (in the process of FIG. 5) such that no shared object in the object list is duplicated due to being referenced multiple times on a single page. Thus, a sharing object is only downloaded once for a page.

In an alternative embodiment, step 290 can be omitted and only the next fraction of page contents can be requested in step 292 regardless of whether that next fraction references a shared object in the object list 140. If that next requested fraction does not include a reference to a "new" shared object (i.e., a shared object that has not been previously downloaded), then step 294 (detailed below) can be skipped. In effect, this allows step 292 to be consecutively implemented multiple times until a new shared object is found and step 294 is implemented.

In next step 294, the finder requests ranges of the document file from the host computer for any non-cached shared objects referenced by the range of page contents data requested in step 292 (the finder also requests appropriate cross reference table information for those shared objects). The finder requests the range of data for the shared object examined in step 290, and also requests ranges for any additional shared objects that are referenced by the requested page contents and which are not in the shared object cache (the finder can compare objects in the cache for each such additional shared object). The finder can determine which shared objects were referenced in which fraction by examining the shared pages list 136, and the offsets for the shared objects are known from the shared object offset table 272. For example, in the described embodiment, the finder can examine the fraction field 146 of nodes in object list 140 and request ranges for all shared objects having the same fraction number as the examined shared object. The finder also requests any cross reference table information from the cross reference table 58 that references these shared objects. The process then returns to step 286.

It should be noted that, since shared image objects are placed at the end of each object list 140 in the sharing pages list 136 and are forced to be in the last fraction of page contents, the image 25 objects are thus forced to be downloaded after all page contents and other interleaved shared objects. If no more shared objects are referenced by remaining fractions of the page contents object in step 286, then the process continues to step 296, where the finder requests a range including all of the remaining page contents data (if any unrequested page contents still remain in the document file). In next step 298, the finder then requests any non-contents shared objects for the page and the appropriate cross-reference table information for those shared objects. As explained above, non-contents shared objects can include objects such as user-specified objects, resource objects which are not forced to be shared (such as procsets), etc., and which are shared. These non-contents shared objects can be found in the object list 140 of the sharing pages list 136. The process is then complete as indicated at 302.

Under some conditions, interleaving may not be desirable. For example, when the page contents are very small, such as under 4 kilobytes, interleaving may provide no significant display speed increase, as described above with reference to FIG. 9. If no interleaving is desired, then the process continues from step 284 to step 300, wherein the finder requests the rest of the contiguous page contents data without interleaving, and also requests the other objects stored after the page contents object that are needed for the display of the page contents object. The "other objects" include shared objects, any appropriate special objects, and any additional cross reference information needed for the objects. For example, the shared objects can be requested in the order they are referenced on the page. In alternate embodiments, the shared objects can be requested first, followed by the page contents. The process is then complete at 302.

EXAMPLE OF DOWNLOADING A REQUESTED PAGE

In an example of the processes of FIGS. 10 and 12, the first page of an electronic document is downloaded from an optimized document file of the present invention and displayed in steps 224, 226, 228, and 230 of FIG. 10. The user then requests to display page 9 in the viewer at step 234 of FIG. 10. In this example, the data needed to display page 9 occurs in the byte ranges of 25000–29000, 112000–113000, and 200000–202000 in the optimized document file, where the first range is the page contents data, and the second two ranges are shared objects referred to by the page contents. The finder finds the cross reference table and offset 25000 for page 9 in step 238 and provides the offset to the viewer. The finder determines the additional ranges at step 240. At step 242, the viewer connects to the source computer and downloads a predetermined amount of data, such as 1K. The finder, meanwhile, has determined that the page contents actually continues to byte 29000. If no interleaving is desired, the finder additionally requests byte range 26000–29000 to be downloaded in step 300 of FIG. 12. Also, the finder has determined by examining sharing pages list 136 that page 9 has two shared objects with sharing ID's of 1 and 2. The finder thus consults the shared object offset table 272 and requests the corresponding shared object byte ranges 112000–113000 and 200000–202000 to be downloaded at the same connection in step 300 of FIG. 12.

If interleaving is implemented, then in step 288 of FIG. 12, the finder examines the next shared object in the object list, which has a sharing ID of 1 and a fraction number of 1. In step 292, the finder requests page contents from the beginning of the page to first fraction. Thus, assuming the fraction is ⅛, each fraction is 4000/8=500 bytes. Since the first fraction references the examined shared object, the finder requests a range of 26000–26500. In step 294, the finder then requests ranges for any shared objects in the first fraction; there is only one in the object list. The finder thus requests the range of 112000–113000 for this shared object as determined from the shared object offset table 272. Since the 5th eighth of the page contents includes a reference to the only other shared object on the page (sharing ID of 2), the process returns to step 286 after step 294. In the next iteration, the finder examines the next shared object in the object list, which has a sharing ID of 2 and is in fraction number 5. The next four eighths of page contents are thus retrieved in step 292, up to and including the 5th eighth that includes the examined shared object (or, alternatively, step 292 can be implemented multiple (5) times by requesting one fraction each time through the loop, and skipping step 294 until the shared object reference is found). Thus, a range of page contents from bytes 26501–28500 of the document file is requested (four fractions=2000 bytes). Then, in step 294, the shared object referenced by the 5th fraction at range 200000–202000 (and its cross reference information) is requested. Since no further shared objects are referenced in the page contents, the finder requests the remaining portion of page contents in step 296, which has a byte range of 28501–29000 (and its cross reference information). All these byte requests are performed during a single connection to the host computer.

Thus, the process of the present invention allows data for an entire requested page to be downloaded from a source computer with only one connection to the source (after the first page has been downloaded). The page data can thus be downloaded and displayed more quickly, with less waiting time for the user. In addition, in the interleaving process, shared objects can be downloaded right after portions of page content that reference those shared objects. This allows portions of a page to be displayed to the user immediately, without having to wait for the shared objects to be downloaded at a later time.

While this invention has been described in terms of several preferred embodiments, it is contemplated that alterations, modifications and permutations thereof will become apparent to those skilled in the art upon a reading of the specification and study of the drawings. For example, the present invention is described as being used for portable electronic documents, such as PDF documents. However, other files or collections of data which, for example, include disjointed objects/data, and/or shared objects/data are well suited to be optimized and downloaded by the present invention. In addition, the shared object interleaving of the described invention is not necessary to provide an optimized file for faster downloading. Also, many of the steps or processes described in the preferred embodiment are specific to the described embodiment, and can be changed or omitted in other embodiments. For example, the use of the finder and viewer in the downloading process of FIG. 10 can be changed to suit a particular embodiment. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for providing a computer-readable document file for a multi-page document, comprising:

writing appearance-defining elements defining the appearance of a specific page of the multi-page document into a computer-readable document file in a non-contiguous manner; and writing page offset hints into the document file, page offset hints indicating the location in the document file of the non-contiguous appearance-defining elements of the specific page, hints being information added to facilitate computer-implemented reading or downloading operations on the document file.

2. The method of claim 1, wherein the appearance-defining elements are retrieved from a non-optimized page-based electronic document having a non-optimized organization of the document information.

3. The method of claim 1, wherein:

the appearance-defining elements include a shared object referenced from more than one page of the multi-page document, and wherein the page offset hints include an offset indicating the location of the shared object in the document file.

4. The method of claim 3, further comprising:

providing one or more contiguous shared objects regions in the document file for storing shared objects.

5. The method of claim 4, wherein two shared objects regions are provided, a first shared objects region for shared objects referenced from a first page of the multi-page document and a second shared objects region for all other shared objects.

6. The method of claim 1, wherein:

the appearance-defining elements comprise page-specific content elements, each page-specific content element being used in defining the appearance of only one page of the multi-page document; and the method further comprises writing shared objects into a contiguous shared objects region following the page-specific content elements in the document file.

7. The method of claim 6, further comprising placing special objects after the shared objects region in the document file, special objects being objects associated with a page of the multi-page document but not defining the appearance of the associated page.

8. The method of claim 2, further comprising:

creating a list of objects retrieved from the non-optimnized electronic document and adding the shared objects from the non-optimized electronic document to the end of the list and writing the list into the document file.

9. The method of claim 8, wherein the step of creating a list of objects includes creating a sharing pages list that identifies referencing pages that reference the shared objects and that further identifies where in the referencing pages the shared objects are referenced.

10. The method of claim 3 wherein the page content information includes text and graphics, and wherein the shared objects include font objects.

11. The method of claim 3 wherein said page contents information can include unshared image objects, and wherein said shared objects can included shared image objects.

12. The method of claim 1, further comprising:

writing into the document file first page offset information for a first page of the multi-page document, the first page offset information being hints indicating the locations in the document file of all appearance-defining elements required to define the appearance of the first page, the first page offset information being provided separate from all other page offset hints.

13. The method of claim 12 wherein said first page offset information is provided near the beginning of the optimized document file.

14. The method of claim 12 wherein the first page offset information includes offsets to page content information for the first page interleaved with offsets to shared objects referenced by the page content information for the first page.

15. The method of claim 1, further comprising:

writing shared data into the document file, shared data being data capable of being shared in defining the appearance of multiple pages of the multi-page document, shared data being referenced by an appearance-defining element of one or more pages of the multi-page document; and writing into the document file shared data hints indicating the location in the document file of the shared data referenced for each page of the multi-page document, hints being optional information added to the document file to optimize computer-implemented reading or downloading operations on the document file.

16. The method of claim 15, wherein the shared data is font data.

17. The method of claim 15, wherein the shared data is image data.

18. The method of claim 15, wherein the shared data is color map data.

19. The method of claim 1, further comprising writing page icon thumbnail objects into the document file.

20. The method of claim 1, further comprising writing bookmark objects into the document file.

21. The method of claim 1, further comprising writing page tree objects into the document file.

22. A method for providing a document file, comprising:

providing document information in the document file, document information defining a plurality of pages of a multi-page document, the document information including page content information that describes individual pages of the multi-page document, wherein the page content information includes unshared data for individual pages and shared data referred to by unshared data, and wherein the unshared data is stored grouped together by page in the document file and shared data referenced by the unshared data is stored separately in the document, whereby the unshared data is generally not contiguous with the shared data in the document file; and providing a page offset table in the document file, the page offset table including page offset information hints identifying the location in the document file of unshared data and referenced shared data for individual pages of the multi-page document.

23. The method of claim 22, further comprising:

providing, separate from said page offset information hints, first page offset information hints for a first page of the multi-page document identifying the location in the document file of all portions of the first page of the multi-page document.

24. The method of claim 22, further comprising:

storing substantially all shared data in a group after the unshared data in the document file.

25. Apparatus comprising a computer-readable storage medium tangibly embodying computer program instructions for writing a computer-readable document file for a multi-page document, comprising instructions to:

write page content information into a computer-readable document file, page content information describing individual pages of the document, the page content information being stored in the document in a non-contiguous manner; and write into the document file page offset hints indicating the location in the document file of the page content information for each page, hints being information added to facilitate computer-implemented reading or downloading operations on the document file.

26. The apparatus of claim 25, further comprising instructions to:

write into the document file first page offset information for a first page of the document, the first page offset information being hints indicating the locations of all portions of the first page in the document file, the first page offset information being provided separate from said page offset hints.

* * * * *

UNITED STATES PATENT AND TRADEMARK OFFICE
CERTIFICATE OF CORRECTION

| | |
|---|---|
| PATENT NO. | : 5,781,785 |
| DATED | : 7/14/1998 |
| INVENTOR(S) | : Rowe et al. |

It is certified that error appears in the above-identified patent and that said Letters Patent is hereby corrected as shown below:

Title sheet,
insert --Assignee: Adobe Systems, Inc., Mountain View, Calif.--.

Claims:
column 30, line 36, change "included" to --include--;
column 31, line 13, before "document" insert --the--;

Signed and Sealed this

Sixteenth Day of February, 1999

Attest:

*Q. Todd Dickinson*

Attesting Officer

*Acting Commissioner of Patents and Trademarks*